US011908396B2

(12) United States Patent
Park et al.

(10) Patent No.: US 11,908,396 B2
(45) **Date of Patent: *Feb. 20, 2024**

(54) DISPLAY APPARATUS

(71) Applicant: Samsung Display Co., Ltd., Yongin-Si (KR)

(72) Inventors: Junhyun Park, Suwon-si (KR); Jangmi Kang, Seoul (KR); Minjae Jeong, Hwaseong-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/123,847

(22) Filed: Mar. 20, 2023

(65) Prior Publication Data

US 2023/0230537 A1 Jul. 20, 2023

Related U.S. Application Data

(63) Continuation of application No. 17/540,075, filed on Dec. 1, 2021, now Pat. No. 11,610,538.

(30) Foreign Application Priority Data

Feb. 19, 2021 (KR) ........................ 10-2021-0022764

(51) Int. Cl.
*G09G 3/32* (2016.01)

(52) U.S. Cl.
CPC ....... *G09G 3/32* (2013.01); *G09G 2300/0426* (2013.01); *G09G 2300/0842* (2013.01); *G09G 2310/0267* (2013.01); *G09G 2310/08* (2013.01)

(58) Field of Classification Search
CPC ................. G09G 2310/08; G09G 3/32; G09G 2310/0267; G09G 2300/0842; G09G 2300/0426
See application file for complete search history.

(56) References Cited

U.S. PATENT DOCUMENTS

| | | | |
|---|---|---|---|
| 2006/0103608 A1 | 5/2006 | Kwak | |
| 2012/0062536 A1 | 3/2012 | Park | |
| 2014/0333686 A1 | 11/2014 | Kim et al. | |
| 2020/0320933 A1 | 10/2020 | Zhou et al. | |
| 2021/0027696 A1 | 1/2021 | Kim et al. | |

FOREIGN PATENT DOCUMENTS

| | | |
|---|---|---|
| KR | 10-0752365 B1 | 8/2007 |
| KR | 10-1878571 B1 | 7/2018 |
| KR | 10-2020-0070156 A | 6/2020 |

*Primary Examiner* — Muhammad N Edun
(74) *Attorney, Agent, or Firm* — Innovation Counsel LLP

(57) ABSTRACT

A display apparatus includes a display panel, a gate driver, a data driver and an emission driver. The display panel includes a pixel. The gate driver is configured to provide a gate signal to the pixel. The data driver is configured to provide a data voltage to the pixel. The emission driver is configured to provide an emission signal to the pixel. The pixel includes a light emitting element, a driving switching element and a bias switching element. The driving switching element is configured to apply a driving current to the light emitting element. The bias switching element is configured to provide a bias voltage to an input electrode of the driving switching element. A frequency of a bias gate signal applied to a control electrode of the bias switching element is greater than a frequency of a data write gate signal applied to the pixel.

18 Claims, 18 Drawing Sheets

DISPLAY APPARATUS

This application is a continuation application of U.S. patent application Ser. No. 17/540,075 filed on Dec. 1, 2021, now U.S. Pat. No. 11,610,538, which claims priority under 35 U.S.C. § 119 to Korean Patent Application No. 10-2021-0022764, filed on Feb. 19, 2021 in the Korean Intellectual Property Office KIPO, the contents of which are herein incorporated by reference in their entireties.

BACKGROUND

1. Field

The present inventive concept relates to a display apparatus. More particularly, the present inventive concept relates to reducing a horizontal line defect in a display apparatus.

2. Description of the Related Art

Generally, a display apparatus includes a display panel and a display panel driver. The display panel includes a plurality of gate lines, a plurality of data lines, a plurality of emission lines and a plurality of pixels. The display panel driver includes a gate driver, a data driver, an emission driver and a driving controller. The gate driver outputs gate signals to the gate lines. The data driver outputs data voltages to the data lines. The emission driver outputs emission signals to the emission lines. The driving controller controls the gate driver, the data driver and the emission driver.

SUMMARY

In an embodiment of a display apparatus according to the present inventive concept, the display apparatus includes a display panel, a gate driver, a data driver and an emission driver. The display panel includes a pixel. The gate driver is configured to provide a gate signal to the pixel. The data driver is configured to provide a data voltage to the pixel. The emission driver is configured to provide an emission signal to the pixel. The pixel includes a light emitting element, a driving switching element and a bias switching element. The driving switching element is configured to apply a driving current to the light emitting element. The bias switching element is configured to provide a bias voltage to an input electrode of the driving switching element. A frequency of a bias gate signal applied to a control electrode of the bias switching element is greater than a frequency of a data write gate signal applied to the pixel.

In an embodiment, the emission driver may be configured to output a first emission signal and a second emission signal to the pixel. The bias voltage may be a high level of the first emission signal.

In an embodiment, the display panel may be driven in a variable frequency. A first frame having a first frequency may include a first active period and a first blank period. A second frame having a second frequency different from the first frequency may include a second active period and a second blank period. A length of the first active period may be substantially the same as a length of the second active period. A length of the first blank period may be different from a length of the second blank period.

In an embodiment, the pixel may include a first transistor including a control electrode connected to a first node, an input electrode connected to a second node and an output electrode connected to a third node, a second transistor including a control electrode configured to receive the data write gate signal, an input electrode configured to receive the data voltage and an output electrode connected to a fourth node, a third transistor including a control electrode configured to receive a compensation gate signal, an input electrode connected to the first node and an output electrode connected to the third node, a fourth transistor including a control electrode configured to receive a first initialization gate signal, an input electrode configured to receive a reference voltage and an output electrode connected to the fourth node, a fifth transistor including a control electrode configured to receive a first emission signal, an input electrode configured to receive a high power voltage and an output electrode connected to the second node, a sixth transistor including a control electrode configured to receive a second emission signal, an input electrode connected to the third node and an output electrode connected to an anode electrode of the light emitting element, a seventh transistor including a control electrode configured to receive the first initialization gate signal, an input electrode configured to receive an initialization voltage and an output electrode connected to the anode electrode of the light emitting element, an eighth transistor including a control electrode configured to receive a second initialization gate signal, an input electrode configured to receive the bias voltage and an output electrode connected to the second node, a storage capacitor including a first electrode configured to receive the high power voltage and a second electrode connected to the first node, a program capacitor including a first electrode connected to the third node and a second electrode connected to the fourth node. The driving switching element may be the first transistor and the bias switching element may be the eighth transistor.

In an embodiment, a width of a second initialization gate line configured to apply the second initialization gate signal may be greater than a width of a first initialization gate line configured to apply the first initialization gate signal.

In an embodiment, a resistance of a second initialization gate line configured to apply the second initialization gate signal may be less than a resistance of a first initialization gate line configured to apply the first initialization gate signal.

In an embodiment, the pixel may include a first transistor including a control electrode connected to a first node, an input electrode connected to a second node and an output electrode connected to a third node, a second transistor including a control electrode configured to receive the data write gate signal, an input electrode configured to receive the data voltage and an output electrode connected to a fourth node, a third transistor including a control electrode configured to receive a compensation gate signal, an input electrode connected to the first node and an output electrode connected to the third node, a fourth transistor including a control electrode configured to receive a first initialization gate signal, an input electrode configured to receive a reference voltage and an output electrode connected to the fourth node, a fifth transistor including a control electrode configured to receive a first emission signal, an input electrode configured to receive a high power voltage and an output electrode connected to the second node, a sixth transistor including a control electrode configured to receive a second emission signal, an input electrode connected to the third node and an output electrode connected to an anode electrode of the light emitting element, a seventh transistor including a control electrode configured to receive the first initialization gate signal, an input electrode configured to receive an initialization voltage and an output electrode connected to the anode electrode of the light emitting element, an eighth transistor including a control electrode configured to receive a second initialization gate signal, an input electrode configured to receive the first emission signal and an output electrode connected to the second node, a storage capacitor including a first electrode configured to receive the high power voltage and a second electrode connected to the first node and a program capacitor including a first electrode connected to the third node and a second electrode connected to the fourth node. The driving switching element may be the first transistor and the bias switching element is the eighth transistor.

In an embodiment, a width of a second initialization gate line configured to apply the second initialization gate signal may be greater than a width of a first initialization gate line configured to apply the first initialization gate signal. A width of a first emission line configured to apply the first emission signal may be greater than a width of a second emission line configured to apply the second emission signal.

In an embodiment, a first emission line configured to apply the first emission signal may be disposed in a source-drain metal layer. A second emission line configured to apply the second emission signal may be disposed in a gate metal layer.

In an embodiment, the pixel may include a first transistor including a control electrode connected to a first node, an input electrode connected to a second node and an output electrode connected to a third node, a second transistor including a control electrode configured to receive the data write gate signal, an input electrode configured to receive the data voltage and an output electrode connected to a fourth node, a third transistor including a control electrode configured to receive a compensation gate signal, an input electrode connected to the first node and an output electrode connected to the third node, a fourth transistor including a control electrode configured to receive a data initialization gate signal, an input electrode configured to receive an initialization voltage and an output electrode connected to the first node, a fifth transistor including a control electrode configured to receive the compensation gate signal, an input electrode configured to receive a reference voltage and an output electrode connected to the fourth node, a sixth transistor including a control electrode configured to receive a second emission signal, an input electrode connected to the third node and an output electrode connected to an anode electrode of the light emitting element, a seventh transistor including a control electrode configured to receive an initialization gate signal, an input electrode configured to receive the initialization voltage and an output electrode connected to the anode electrode of the light emitting element, an eighth transistor including a control electrode configured to receive the initialization gate signal, an input electrode configured to receive a first emission signal and an output electrode connected to the second node, a ninth transistor including a control electrode configured to receive the first emission signal, an input electrode configured to receive a high power voltage and an output electrode connected to the second node, a hold capacitor including a first electrode configured to receive the high power voltage and a second electrode connected to the fourth node and a storage capacitor including a first electrode connected to the fourth node and a second electrode connected to the first node. The driving switching element may be the first transistor and the bias switching element may be the eighth transistor.

In an embodiment, a width of an initialization gate line configured to apply the initialization gate signal may be greater than a width of a data write gate line configured to apply the data write gate signal. A width of a first emission line configured to apply the first emission signal may be greater than a width of a second emission line configured to apply the second emission signal.

In an embodiment, the gate driver may include a normal gate driver configured to generate a gate signal not applied to the bias switching element and a bias gate driver configured to generate a gate signal applied to the bias switching element.

In an embodiment, a width of a bias clock line configured to apply a clock signal to the bias gate driver may be greater than a width of a normal clock line configured to apply a clock signal to the normal gate driver.

In an embodiment, the normal gate driver disposed in a first area may be configured to receive a clock signal through a normal clock line disposed in a first source-drain layer. The bias gate driver disposed in a second area may be configured to receive a clock signal through a bias clock line formed as a dual layer in the first source-drain layer and a second source-drain layer.

In an embodiment, a stage of the normal gate driver may be configured to receive a first clock signal, a gate high voltage and a gate low voltage. A stage of the bias gate driver may be configured to receive a second clock signal different from the first clock signal, the gate high voltage and the gate low voltage.

In an embodiment, a high level of the first clock signal may be substantially the same as the gate high voltage. A high level of the second clock signal may be greater than the gate high voltage.

In an embodiment, a stage of the normal gate driver may be configured to receive a clock signal, a first gate high voltage and a first gate low voltage. A stage of the bias gate driver may be configured to receive the clock signal, a second gate high voltage different from the first gate high voltage and a second gate low voltage different from the first gate low voltage.

In an embodiment, a bias line configured to apply the bias voltage may extend in a second direction and commonly connected to a plurality of pixels disposed in a first direction.

In an embodiment, the pixel may include a first transistor including a control electrode connected to a first node, an input electrode connected to a second node and an output electrode connected to a third node, a second transistor including a control electrode configured to receive the data write gate signal, an input electrode configured to receive the data voltage and an output electrode connected to a fourth node, a third transistor including a control electrode configured to receive a compensation gate signal, an input electrode connected to the first node and an output electrode connected to the third node, a fourth transistor including a control electrode configured to receive a data initialization gate signal, an input electrode configured to receive an initialization voltage and an output electrode connected to the first node, a fifth transistor including a control electrode configured to receive the compensation gate signal, an input electrode configured to receive a reference voltage and an output electrode connected to the fourth node, a sixth transistor including a control electrode configured to receive a second emission signal, an input electrode connected to the third node and an output electrode connected to an anode electrode of the light emitting element, a seventh transistor including a control electrode configured to receive a first initialization gate signal, an input electrode configured to receive the initialization voltage and an output electrode connected to the anode electrode of the light emitting element, an eighth transistor including a control electrode configured to receive a second initialization gate signal, an input electrode configured to receive the bias voltage and an output electrode connected to the second node, a ninth transistor including a control electrode configured to receive a first emission signal, an input electrode configured to receive a high power voltage and an output electrode connected to the second node, a hold capacitor including a first electrode configured to receive the high power voltage and a second electrode connected to the fourth node and a storage capacitor including a first electrode connected to the fourth node and a second electrode connected to the first node. The driving switching element may be the first transistor and the bias switching element may be the eighth transistor.

In an embodiment, a length of a high duration of the first emission signal in a data writing period when the data voltage is written to the pixel may be less than a length of a high duration of the first emission signal in a self scan period when the data voltage is not written to the pixel and the light emitting element is turned on.

According to the display apparatus, in the self scan period of the display apparatus supporting the variable frequency, the bias operation of applying the bias voltage to the input electrode of the driving transistor may be operated in the high frequency so that a flicker may be prevented.

When the bias operation is operated in the high frequency in the self scan period, a horizontal line defect may occur due to an increase of the load of the gate driving signal. The width of the horizontal signal line of the pixel related to the bias operation may be formed to be wide so that the horizontal line defect may be prevented. In addition, the horizontal signal line of the pixel related to the bias operation may be formed with a metal layer having a low resistance so that the horizontal line defect may be prevented. In addition, the horizontal signal line of the pixel related to the bias operation may be formed as a dual layer of the first source-drain layer and the second source-drain layer so that the horizontal line defect may be prevented. In addition, the width of the gate driving signal line applied to the gate driver and related to the bias operation may be formed to be wide so that the horizontal line defect may be prevented. In addition, the gate driving signal applied to the gate driver and related to the bias operation may be adjusted so that the horizontal line defect may be prevented.

DETAILED DESCRIPTION OF THE INVENTIVE CONCEPT

Embodiments of the present inventive concept provide a display apparatus capable of preventing a horizontal line defect and enhancing a display quality in the display apparatus supporting a variable frequency.

An embodiment of a display apparatus of the present inventive concept includes supporting a variable frequency, a bias operation of applying a bias voltage to an input electrode of a driving transistor of the pixel may be operated. When a load for applying a control signal to a bias transistor which operates the bias operation, a horizontal line defect in which a horizontal line is shown to a user in the display panel may occur.

Therefore, the horizontal line defect may be prevented in the display apparatus supporting the variable frequency so that the display quality of the display apparatus may be enhanced.

Hereinafter, the present inventive concept will be explained in detail with reference to the accompanying drawings.

Figure 1:
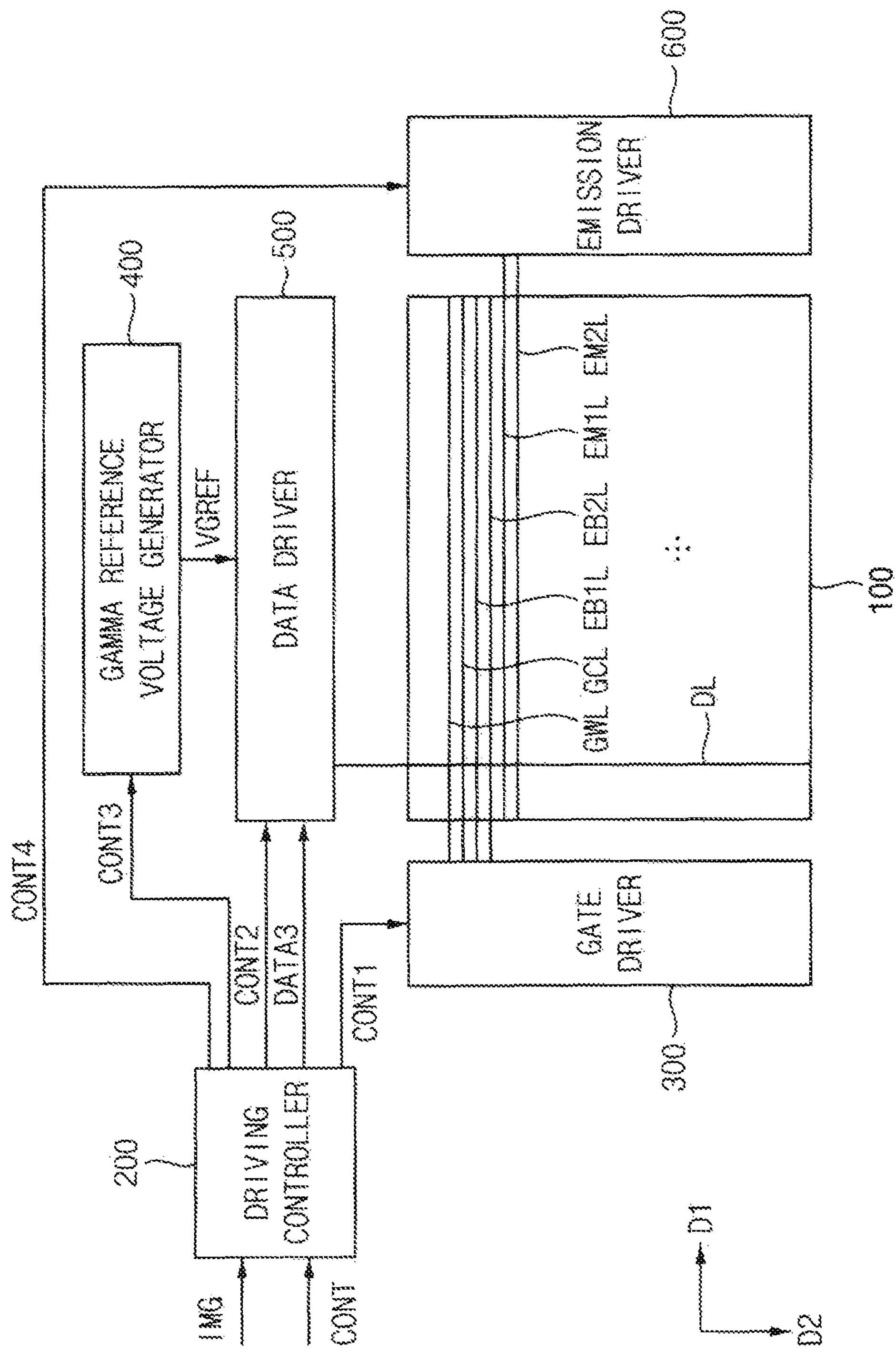
FIG. 1 is a block diagram illustrating a display apparatus according to an embodiment of the present inventive concept.

FIG. 1 is a block diagram illustrating a display apparatus according to an embodiment of the present inventive concept.

Referring to FIG. 1, the display apparatus includes a display panel 100 and a display panel driver. The display panel driver includes a driving controller 200, a gate driver 300, a gamma reference voltage generator 400, a data driver 500 and an emission driver 600.

The display panel 100 has a display region on which an image is displayed and a peripheral region adjacent to the display region.

The display panel 100 includes a plurality of gate lines GWL, GCL, EB1L and EB2L, a plurality of data lines DL, a plurality of emission lines EM1L and EM2L and a plurality of pixels electrically connected to the gate lines GWL, GCL, EB1L and EB2L, the data lines DL and the emission lines EM1L and EM2L. The gate lines GWL, GCL, EB1L and EB2L may extend in a first direction D1, the data lines DL may extend in a second direction D2 crossing the first direction D1 and the emission lines EM1L and EM2L may extend in the first direction D1.

The driving controller 200 receives input image data IMG and an input control signal CONT from an external apparatus. For example, the input image data IMG may include red image data, green image data and blue image data. The input image data IMG may include white image data. The input image data IMG may include magenta image data, cyan image data and yellow image data. The input control signal CONT may include a master clock signal and a data enable signal. The input control signal CONT may further include a vertical synchronizing signal and a horizontal synchronizing signal.

The driving controller 200 generates a first control signal CONT1, a second control signal CONT2, a third control signal CONT3, a fourth control signal CONT4 and a data signal DATA based on the input image data IMG and the input control signal CONT.

The driving controller 200 generates the first control signal CONT1 for controlling an operation of the gate driver 300 based on the input control signal CONT, and outputs the first control signal CONT1 to the gate driver 300. The first control signal CONT1 may include a vertical start signal and a gate clock signal.

The driving controller 200 generates the second control signal CONT2 for controlling an operation of the data driver 500 based on the input control signal CONT, and outputs the second control signal CONT2 to the data driver 500. The second control signal CONT2 may include a horizontal start signal and a load signal.

The driving controller 200 generates the data signal DATA based on the input image data IMG. The driving controller 200 outputs the data signal DATA to the data driver 500.

The driving controller 200 generates the third control signal CONT3 for controlling an operation of the gamma reference voltage generator 400 based on the input control signal CONT, and outputs the third control signal CONT3 to the gamma reference voltage generator 400.

The driving controller 200 generates the fourth control signal CONT4 for controlling an operation of the emission driver 600 based on the input control signal CONT, and outputs the fourth control signal CONT4 to the emission driver 600.

The gate driver 300 generates gate signals driving the gate lines GWL, GCL, EB1L and EB2L in response to the first control signal CONT1 received from the driving controller 200. The gate driver 300 may sequentially output the gate signals to the gate lines GWL, GCL, EB1L and EB2L.

The gamma reference voltage generator 400 generates a gamma reference voltage VGREF in response to the third control signal CONT3 received from the driving controller 200.

The gamma reference voltage generator 400 provides the gamma reference voltage VGREF to the data driver 500. The gamma reference voltage VGREF has a value corresponding to a level of the data signal DATA.

In an embodiment, the gamma reference voltage generator 400 may be disposed in the driving controller 200, or in the data driver 500.

The data driver 500 receives the second control signal CONT2 and the data signal DATA from the driving controller 200, and receives the gamma reference voltages VGREF from the gamma reference voltage generator 400. The data driver 500 converts the data signal DATA into data voltages having an analog type using the gamma reference voltages VGREF. The data driver 500 outputs the data voltages to the data lines DL.

The emission driver 600 generates emission signals to drive the emission lines EM1L and EM2L in response to the fourth control signal CONT4 received from the driving controller 200. The emission driver 600 may output the emission signals to the emission lines EM1L and EM2L.

Although the gate driver 300 is disposed at a first side of the display panel 100 and the emission driver 600 is disposed at a second side of the display panel 100 opposite to the first side in FIG. 1 for convenience of explanation, the present inventive concept may not be limited thereto. For example, both of the gate driver 300 and the emission driver 600 may be disposed at the first side of the display panel 100. For example, the gate driver 300 and the emission driver 600 may be integrally formed.

Figure 2:
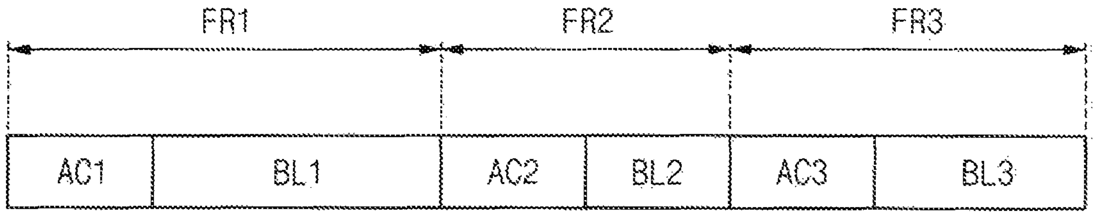
FIG. 2 is a conceptual diagram illustrating a driving frequency of a display panel of FIG. 1.

FIG. 2 is a conceptual diagram illustrating a driving frequency of a display panel of FIG. 1.

Referring to FIGS. 1 and 2, the display panel 100 may be driven in a variable frequency. A first frame FR1 having a first frequency may include a first active period AC1 and a first blank period BL1. A second frame FR2 having a second frequency different from the first frequency may include a second active period AC2 and a second blank period BL2. A third frame FR3 having a third frequency different from the first frequency and the second frequency may include a third active period AC3 and a third blank period BL3.

The first active period AC1 may have a length substantially the same as a length of the second active period AC2. The first blank period BL1 may have a length different from a length of the second blank period BL2.

The second active period AC2 may have the length substantially the same as a length of the third active period AC3. The second blank period BL2 may have the length different from a length of the third blank period BL3.

The display apparatus supporting the variable frequency may include a data writing period in which the data voltage is written to the pixel and a self scan period in which only light emission is operated without writing the data voltage to the pixel. The data writing period may be disposed in the active period AC1, AC2 and AC3. The self scan period may be disposed in the blank period BL1, BL2 and BL3.

Figure 3A:
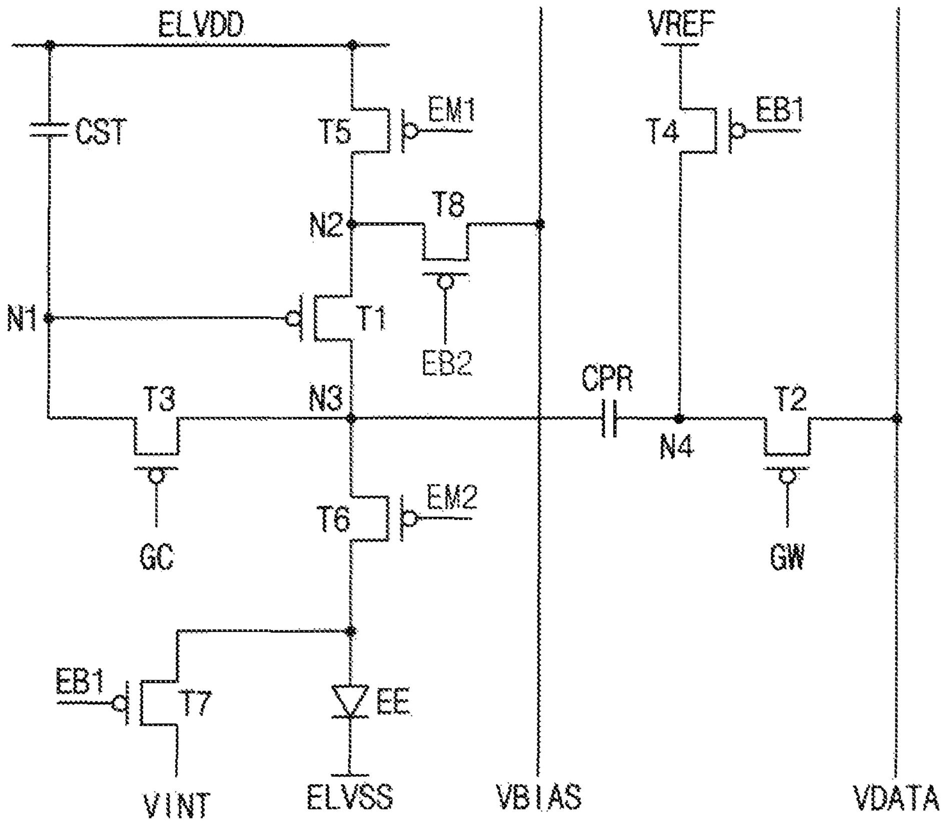
FIG. 3A is a circuit diagram illustrating an example of a pixel of the display panel of FIG. 1.

FIG. 3A is a circuit diagram illustrating an example of a pixel of the display panel 100 of FIG. 1.

Referring to FIGS. 1, 2 and 3A, the pixel may include a light emitting element EE, a driving switching element (e.g. T1) applying a driving current to the light emitting element EE and a bias switching element (e.g. T8) providing a bias voltage to an input electrode of the driving switching element (e.g. T1). A frequency of a bias gate signal (e.g. EB1) applied to a control electrode of the bias switching element (e.g. T8) may be greater than a frequency of a data write gate signal (e.g. GW) applied to the pixel.

The emission driver 600 may output a first emission signal EM1 and a second emission signal EM2 to the pixel.

In the present embodiment, the pixel may include a first transistor T1 including a control electrode connected to a first node N1, an input electrode connected to a second node N2 and an output electrode connected to a third node N3, a second transistor T2 including a control electrode receiving the data write gate signal GW, an input electrode receiving the data voltage VDATA and an output electrode connected to a fourth node N4, a third transistor T3 including a control electrode receiving a compensation gate signal GC, an input electrode connected to the first node N1 and an output electrode connected to the third node N3, a fourth transistor T4 including a control electrode receiving a first initialization gate signal EB1, an input electrode receiving a reference voltage VREF and an output electrode connected to the fourth node N4, a fifth transistor T5 including a control electrode receiving the first emission signal EM1, an input electrode receiving a high power voltage ELVDD and an output electrode connected to the second node N2, a sixth transistor T6 including a control electrode receiving the second emission signal EM2, an input electrode connected to the third node N3 and an output electrode connected to an anode electrode of the light emitting element EE, a seventh transistor T7 including a control electrode receiving the first initialization gate signal EB1, an input electrode receiving an initialization voltage VINT and an output electrode connected to the anode electrode of the light emitting element EE, an eighth transistor T8 including a control electrode receiving a second initialization gate signal EB2, an input electrode receiving the bias voltage and an output electrode connected to the second node N2, a storage capacitor CST including a first electrode receiving the high power voltage ELVDD and a second electrode connected to the first node N1, and a program capacitor CPR including a first electrode connected to the third node N3 and a second electrode connected to the fourth node N4. The light emitting element EE may include the anode electrode and a cathode electrode receiving a low power voltage ELVSS.

The driving switching element may be the first transistor T1. The bias switching element may be the eighth transistor T8.

Figure 3B:
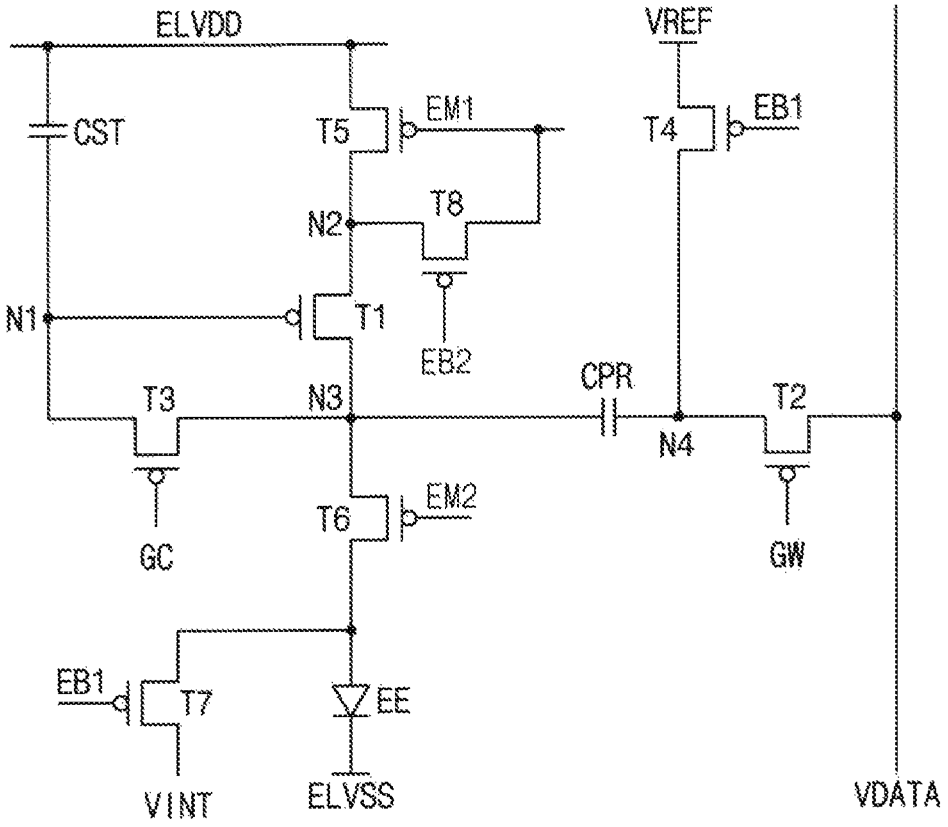
FIG. 3B is a circuit diagram illustrating an example of a pixel of the display panel of FIG. 1.

FIG. 3B is a circuit diagram illustrating an example of a pixel of the display panel 100 of FIG. 1.

Referring to FIGS. 1, 2 and 3B, the emission driver 600 may output a first emission signal EM1 and a second emission signal EM2 to the pixel. In the present embodiment, the bias voltage may be a high level of the first emission signal EM1.

In the present embodiment, the pixel may include a first transistor T1 including a control electrode connected to a first node N1, an input electrode connected to a second node N2 and an output electrode connected to a third node N3, a second transistor T2 including a control electrode receiving the data write gate signal GW, an input electrode receiving the data voltage VDATA and an output electrode connected to a fourth node N4, a third transistor T3 including a control electrode receiving a compensation gate signal GC, an input electrode connected to the first node N1 and an output electrode connected to the third node N3, a fourth transistor T4 including a control electrode receiving a first initialization gate signal EB1, an input electrode receiving a reference voltage VREF and an output electrode connected to the fourth node N4, a fifth transistor T5 including a control electrode receiving the first emission signal EM1, an input electrode receiving a high power voltage ELVDD and an output electrode connected to the second node N2, a sixth transistor T6 including a control electrode receiving the second emission signal EM2, an input electrode connected to the third node N3 and an output electrode connected to an anode electrode of the light emitting element EE, a seventh transistor T7 including a control electrode receiving the first initialization gate signal EB1, an input electrode receiving an initialization voltage VINT and an output electrode connected to the anode electrode of the light emitting element EE, an eighth transistor T8 including a control electrode receiving a second initialization gate signal EB2, an input electrode receiving the first emission signal EM1 and an output electrode connected to the second node N2, a storage capacitor CST including a first electrode receiving the high power voltage ELVDD and a second electrode connected to the first node N1, and a program capacitor CPR including a first electrode connected to the third node N3 and a second electrode connected to the fourth node N4. The light emitting element EE may include the anode electrode and a cathode electrode receiving a low power voltage ELVSS.

The driving switching element may be the first transistor T1. The bias switching element may be the eighth transistor T8.

Figure 3C:
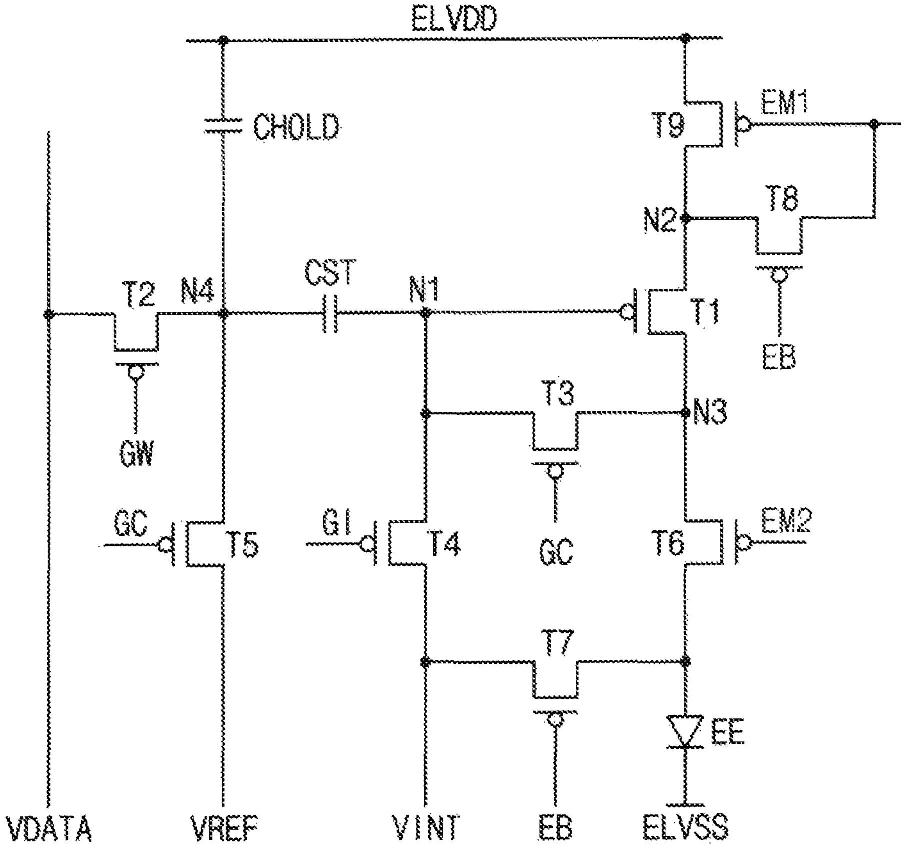
FIG. 3C is a circuit diagram illustrating an example of a pixel of the display panel of FIG. 1.

FIG. 3C is a circuit diagram illustrating an example of a pixel of the display panel 100 of FIG. 1.

Referring to FIGS. 1, 2 and 3C, the emission driver 600 may output a first emission signal EM1 and a second emission signal EM2 to the pixel. In the present embodiment, the bias voltage may be a high level of the first emission signal EM1.

The pixel may include a first transistor T1 including a control electrode connected to a first node N1, an input electrode connected to a second node N2 and an output electrode connected to a third node N3, a second transistor T2 including a control electrode receiving the data write gate signal GW, an input electrode receiving the data voltage VDATA and an output electrode connected to a fourth node N4, a third transistor T3 including a control electrode receiving a compensation gate signal GC, an input electrode connected to the first node N1 and an output electrode connected to the third node N3, a fourth transistor T4 including a control electrode receiving a data initialization gate signal GI, an input electrode receiving an initialization voltage VINT and an output electrode connected to the first node N1, a fifth transistor T5 including a control electrode receiving the compensation gate signal GC, an input electrode receiving a reference voltage VREF and an output electrode connected to the fourth node N4, a sixth transistor T6 including a control electrode receiving the second emission signal EM2, an input electrode connected to the third node N3 and an output electrode connected to an anode electrode of the light emitting element EE, a seventh transistor T7 including a control electrode receiving an initialization gate signal EB, an input electrode receiving the initialization voltage VINT and an output electrode connected to the anode electrode of the light emitting element EE, an eighth transistor T8 including a control electrode receiving the initialization gate signal EB, an input electrode receiving the first emission signal EM1 and an output electrode connected to the second node N2, a ninth transistor T9 including a control electrode receiving the first emission signal EM1, an input electrode receiving a high power voltage ELVDD and an output electrode connected to the second node N2, a hold capacitor CHOLD including a first electrode receiving the high power voltage ELVDD and a second electrode connected to the fourth node N4 and a storage capacitor CST including a first electrode connected to the fourth node N4 and a second electrode connected to the first node N1. The light emitting element EE may include the anode electrode and a cathode electrode receiving a low power voltage ELVSS.

The driving switching element may be the first transistor T1. The bias switching element may be the eighth transistor T8.

Figure 4:
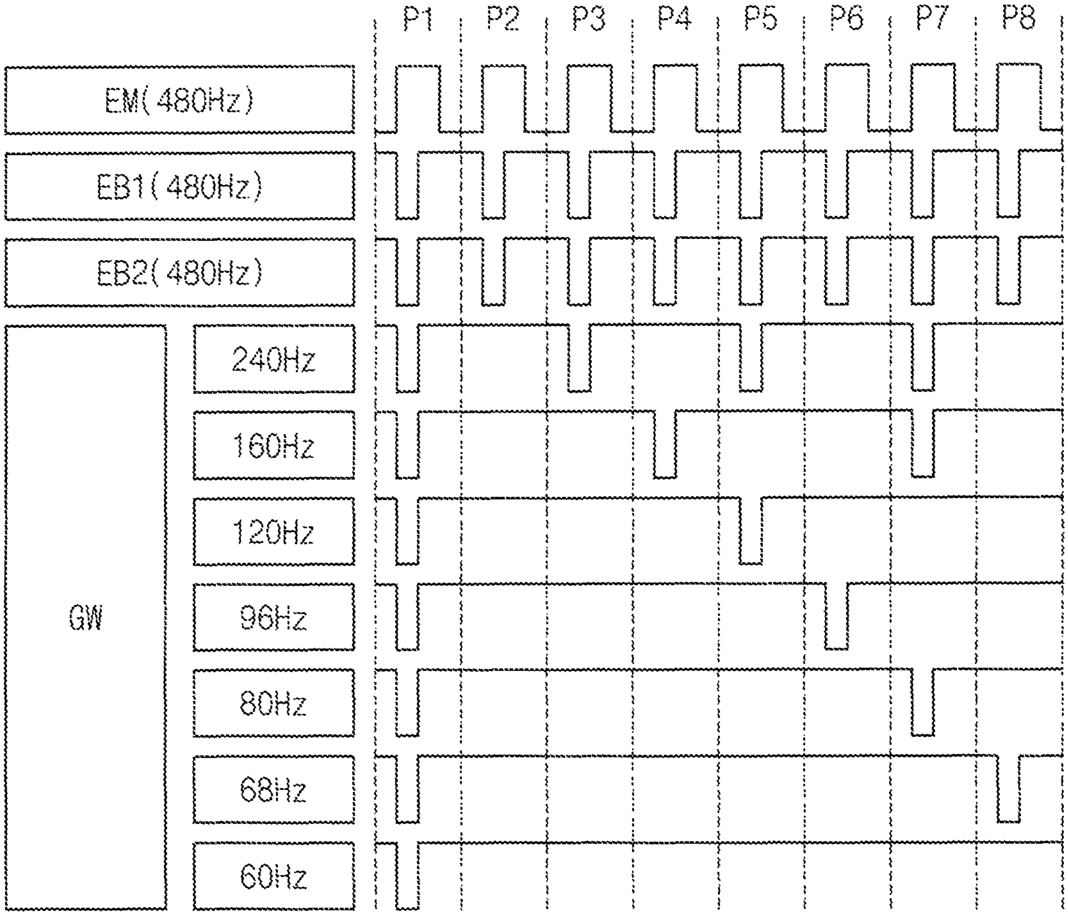
FIG. 4 is a timing diagram illustrating driving signals of the pixel of FIG. 3A.
Figure 5:
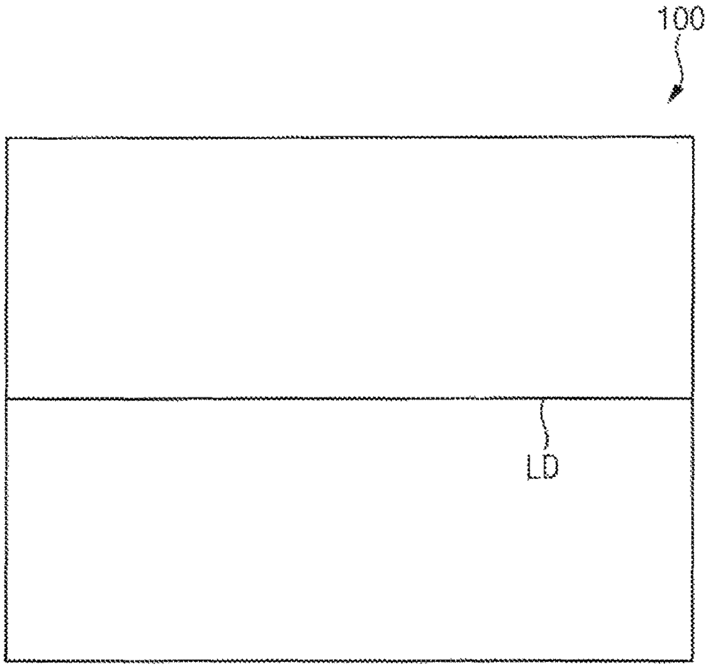
FIG. 5 is a conceptual diagram illustrating an example of a horizontal line defect displayed on the display panel of FIG. 1.
Figure 6:
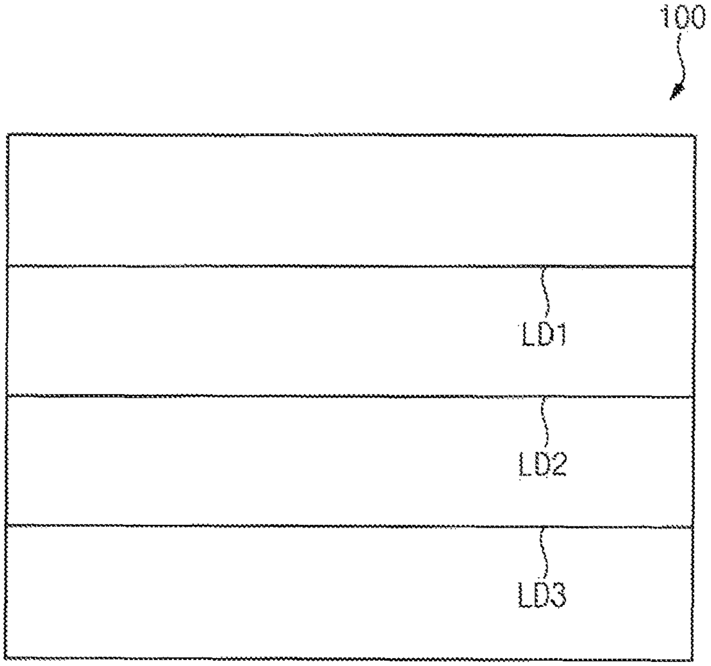
FIG. 6 is a conceptual diagram illustrating an example of a horizontal line defect displayed on the display panel of FIG. 1.

FIG. 4 is a timing diagram illustrating driving signals of the pixel of FIG. 3A. FIG. 5 is a conceptual diagram illustrating an example of a horizontal line defect displayed on the display panel 100 of FIG. 1. FIG. 6 is a conceptual diagram illustrating an example of a horizontal line defect displayed on the display panel 100 of FIG. 1.

Referring to FIGS. 1 to 6, the display panel 100 may be driven in the variable frequency. For example, the display panel 100 may be driven in a maximum frequency of 240 Hz. When the display panel 100 is driven in the frequency of 240 Hz, the data write gate signal GW may have active pulses in a first period P1, a third period P3, a fifth period P5 and a seventh period P7 so that a data writing operation may be operated in the first period P1, the third period P3, the fifth period P5 and the seventh period P7. When the display panel 100 is driven in the frequency of 120 Hz, the data write gate signal GW may have active pulses in the first period P1 and the fifth period P5 so that the data writing operation may be operated in the first period P1 and the fifth period P5.

When the display panel is driven in the frequency of 240 Hz, an emission operation EM of the light emission element EE may be operated in a frequency of 480 Hz, an initialization operation EB1 of the light emission element EE may be operated in the frequency of 480 Hz and a bias operation EB2 of the light emission element EE may be operated in the frequency of 480 Hz.

As explained above, when the display panel 100 is driven in the frequency of 240 Hz and the emission operation EM is operated in the frequency of 480 Hz, it may be referred that the display panel 100 operates in two cycles.

When the display panel is driven in the frequency of 120 Hz, an emission operation EM of the light emission element EE may be operated in a frequency of 480 Hz, an initialization operation EB1 of the light emission element EE may be operated in the frequency of 480 Hz and a bias operation EB2 of the light emission element EE may be operated in the frequency of 480 Hz.

As explained above, when the display panel 100 is driven in the frequency of 120 Hz and the emission operation EM is operated in the frequency of 480 Hz, it may be referred that the display panel 100 operates in four cycles.

The display apparatus supporting the variable frequency may include a data writing period in which the data voltage is written to the pixel and a self scan period in which only light emission is operated without writing the data voltage to the pixel. In the self scan period, the bias operation of applying the bias voltage to the input electrode of the driving switching element T1 may be operated. When the load for applying the control signal to the bias switching element T8 which operates the bias operation, a horizontal line defect in which a horizontal line is shown to a user in the display panel 100 may occur.

When the display panel 100 is operated in two cycles, a horizontal line LD may be displayed at a central portion of the display panel 100 in a vertical direction as shown in FIG. 5 due to an increase of the load of the gate driving signal of the gate driver 300.

In addition, when the display panel 100 is operated in four cycles, horizontal lines LD1, LD2 and LD3 may be displayed at ¼, ½ and ¾ points of the display panel 100 in the vertical direction as shown in FIG. 6 due to an increase of the load of the gate driving signal of the gate driver 300.

Figure 7A:
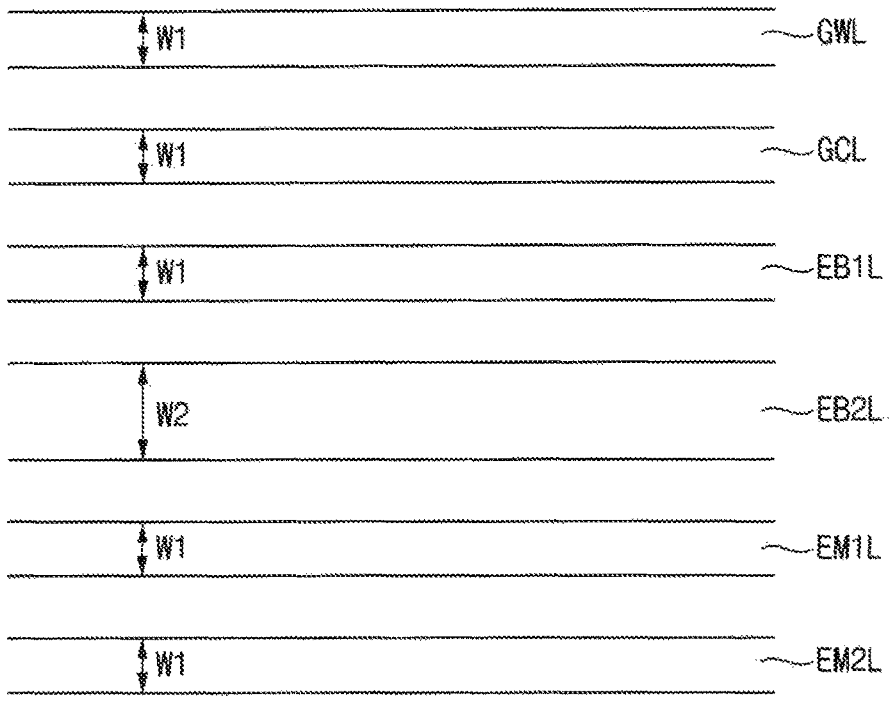
FIG. 7A is a conceptual diagram illustrating horizontal signal lines applying gate signals and emission signals to the pixel of FIG. 3A.

FIG. 7A is a conceptual diagram illustrating horizontal signal lines applying gate signals and emission signals to the pixel of FIG. 3A.

Referring to FIGS. 1 to 7A, the horizontal signal lines applying the gate signals and the emission signals to the pixel may include a data write gate line GWL applying the data write gate signal GW, a compensation gate line GCL applying the compensation gate signal GC, a first initialization gate line EB1L applying the first initialization gate signal EB1, a second initialization gate line EB2L applying the second initialization gate signal EB2, a first emission line EM1L applying a first emission signal EM1 and a second emission line EM2L applying a second emission signal EM2.

The second initialization gate line EB2L is related to the bias operation of applying the bias voltage to the input electrode of the driving switching element T1 in the pixel of FIG. 3A and other horizontal signal lines are not related to the bias operation. Herein, the horizontal signal line related to the bias operation may mean a line connected to the control electrode or the input electrode of the eighth transistor T8.

As shown in FIG. 7A, a width W2 of the second initialization gate line EB2L which is related to the bias operation may be greater than widths W1 of horizontal signal lines which are not related to the bias operation.

For example, the width W2 of the second initialization gate line EB2L may be greater than the width of the first initialization gate line EB1L.

Figure 7B:
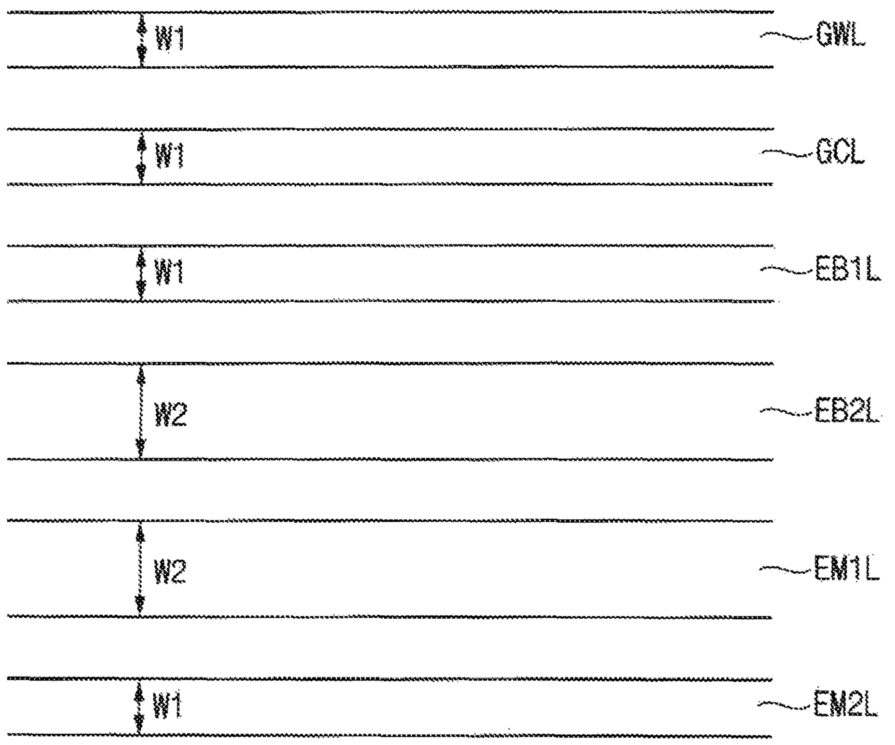
FIG. 7B is a conceptual diagram illustrating horizontal signal lines applying gate signals and emission signals to the pixel of FIG. 3B.

FIG. 7B is a conceptual diagram illustrating horizontal signal lines applying gate signals and emission signals to the pixel of FIG. 3B.

The second initialization gate line EB2L and the first emission line EM1L are related to the bias operation of applying the bias voltage to the input electrode of the driving switching element T1 in the pixel of FIG. 3B and other horizontal signal lines are not related to the bias operation.

As shown in FIG. 7B, widths W2 of the second initialization gate line EB2L and the first emission line EM1L which are related to the bias operation may be greater than widths W1 of horizontal signal lines which are not related to the bias operation.

For example, the width W2 of the second initialization gate line EB2L may be greater than the width W1 of the first initialization gate line EB1L. For example, the width W2 of the first emission line EM1L may be greater than the width W1 of the second emission line EM2L.

Herein, for example, the width W2 of the second initialization gate line EB2L may be same as the width W2 of the first emission line EM1L. Alternatively, the width of the second initialization gate line EB2L may be different from the width of the first emission line EM1L. For example, the width W1 of the first initialization gate line EB1L may be same as the width W1 of the second emission line EM2L. Alternatively, the width of the first initialization gate line EB1L may be different from the width of the second emission line EM2L.

Figure 7C:
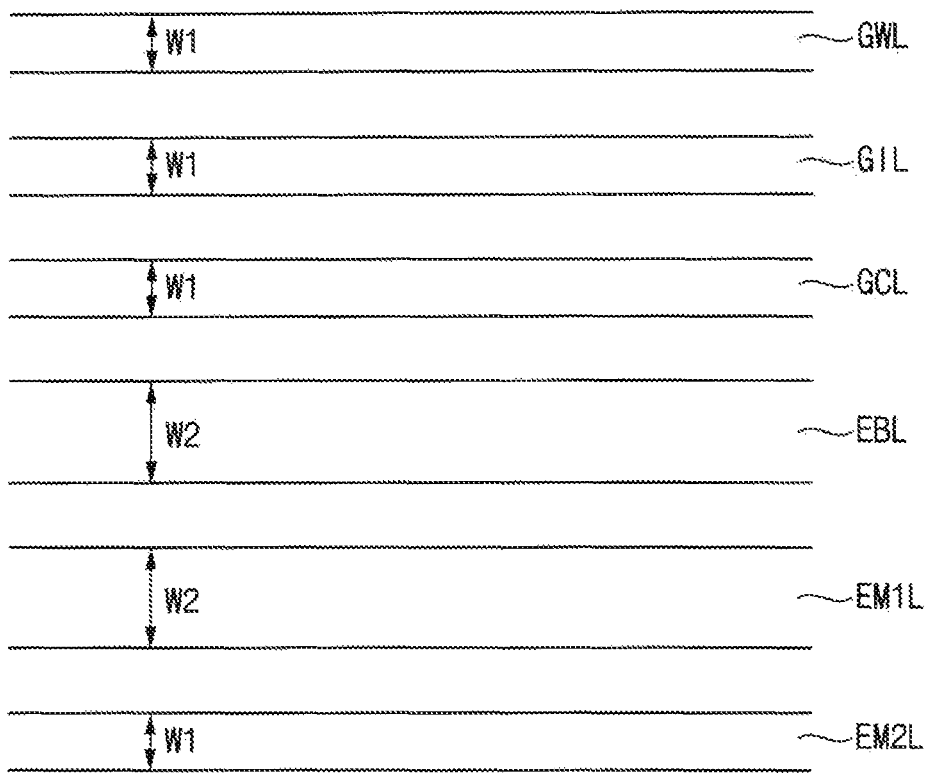
FIG. 7C is a conceptual diagram illustrating horizontal signal lines applying gate signals and emission signals to the pixel of FIG. 3C.

FIG. 7C is a conceptual diagram illustrating horizontal signal lines applying gate signals and emission signals to the pixel of FIG. 3C.

The initialization gate line EBL and the first emission line EM1L are related to the bias operation of applying the bias voltage to the input electrode of the driving switching element T1 in the pixel of FIG. 3C and other horizontal signal lines are not related to the bias operation.

As shown in FIG. 7C, widths W2 of the initialization gate line EBL and the first emission line EM1L which are related to the bias operation may be greater than widths W1 of horizontal signal lines which are not related to the bias operation.

For example, the width W2 of the initialization gate line EBL may be greater than the width W1 of the data write gate line GWL. For example, the width W2 of the first emission line EM1L may be greater than the width W1 of the second emission line EM2L.

As shown in FIGS. 7A to 7C, the width of the horizontal signal lines related to the bias operation may be formed to be wide so that the horizontal line defect may be prevented.

Figure 8:
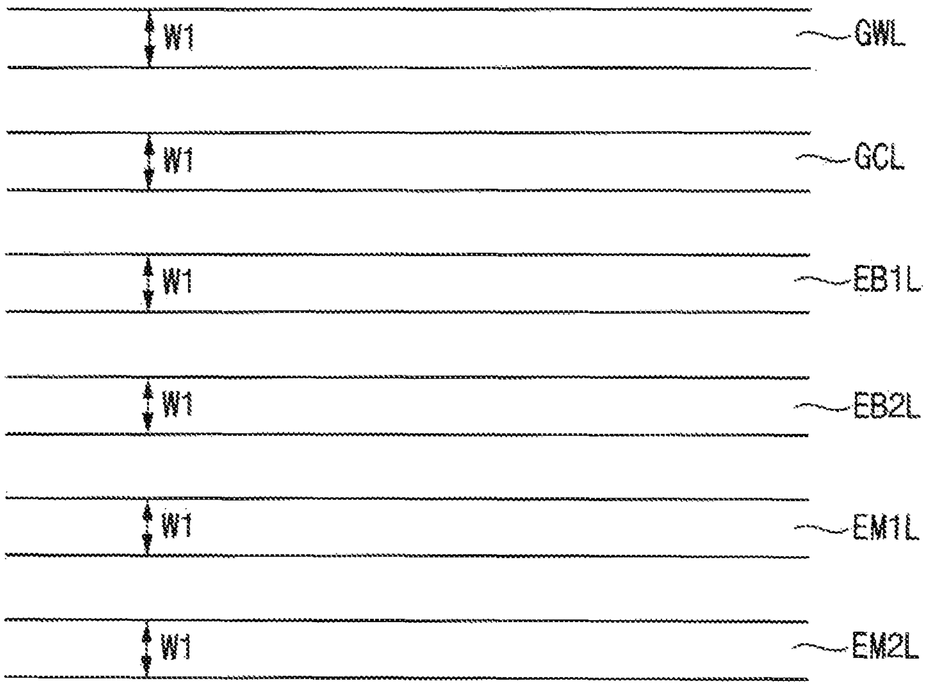
FIG. 8 is a conceptual diagram illustrating horizontal signal lines applying gate signals and emission signals to the pixel of FIG. 3A.

FIG. 8 is a conceptual diagram illustrating horizontal signal lines applying gate signals and emission signals to the pixel of FIG. 3A.

Referring to FIG. 8, the horizontal signal lines applying the gate signals and the emission signals to the pixel may include a data write gate line GWL applying the data write gate signal GW, a compensation gate line GCL applying the compensation gate signal GC, a first initialization gate line EB1L applying the first initialization gate signal EB1, a second initialization gate line EB2L applying the second initialization gate signal EB2, a first emission line EM1L applying a first emission signal EM1 and a second emission line EM2L applying a second emission signal EM2.

The second initialization gate line EB2L is related to the bias operation of applying the bias voltage to the input electrode of the driving switching element T1 in the pixel of FIG. 3A and other horizontal signal lines are not related to the bias operation. Herein, the horizontal signal line related to the bias operation may mean a line connected to the control electrode or the input electrode of the eighth transistor T8.

As shown in FIG. 8, a width W1 of the second initialization gate line EB2L which is related to the bias operation may be substantially the same as widths W1 of horizontal signal lines which are not related to the bias operation. In the present embodiment, a resistance of the second initialization gate line EB2L which is related to the bias operation may be less than resistances of horizontal signal lines which are not related to the bias operation.

In FIG. 8, the resistance of the horizontal signal lines related to the bias operation may be formed to be low so that the horizontal line defect may be prevented.

Figure 9:
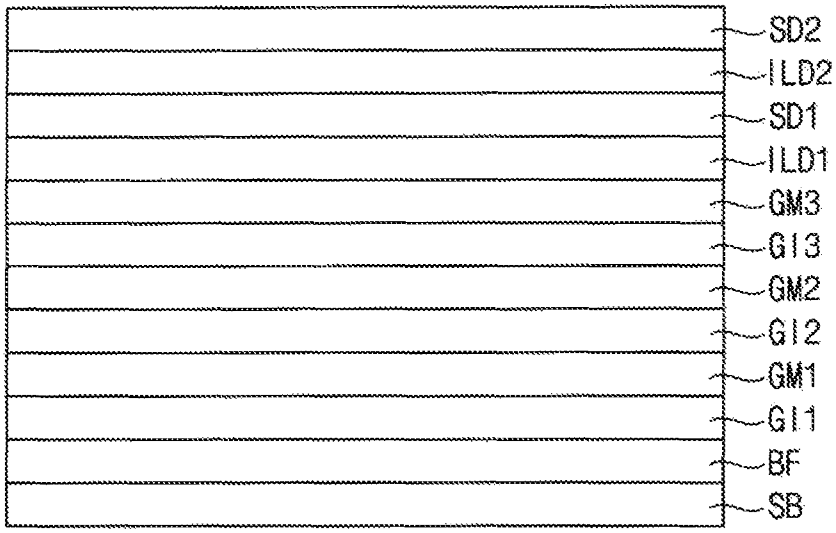
FIG. 9 is a conceptual diagram illustrating a layer structure of the display panel of FIG. 1.

FIG. 9 is a conceptual diagram illustrating a layer structure of the display panel of FIG. 1.

Referring to FIG. 9, the display panel 100 may include a substrate SB, a buffer layer BF disposed on the substrate SB, a first gate insulation layer GI1 disposed on the buffer layer BF, a first gate metal layer GM1 disposed on the first gate insulation layer GI1, a second gate insulation layer GI2 disposed on the first gate metal layer GM1, a second gate metal layer GM2 disposed on the second gate insulation layer GI2, a third gate insulation layer GI3 disposed on the second gate metal layer GM2, a third gate metal layer GM3 disposed on the third gate insulation layer GI3, a first interlayer insulating layer ILD1 disposed on the third metal layer GM3, a first source-drain metal layer SD1 disposed on the first interlayer insulating layer ILD1, a second interlayer insulating layer ILD2 disposed on the first source-drain metal layer SD1, a second source-drain metal layer SD2 disposed on the second interlayer insulating layer ILD2.

For example, in the pixel structure of FIG. 3B, the first emission line EM1L applying the first emission signal EM1 may be disposed in the source-drain metal layer SD1 or SD2 and the second emission line EM2L applying the second emission signal EM2 may be disposed in the gate metal layer GM1, GM2 or GM3. The source-drain metal layer may have a resistance lower than a resistance of the gate metal layer. Thus, when the first emission line EM1L applying the first emission signal EM1 is disposed in the source-drain metal layer SD1 or SD2 and the second emission line EM2L applying the second emission signal EM2 is disposed in the gate metal layer GM1, GM2 or GM3, the resistance of the horizontal signal line of the pixel related to the bias operation may be relatively low in FIG. 9 so that the horizontal line defect may be prevented.

Figure 10:
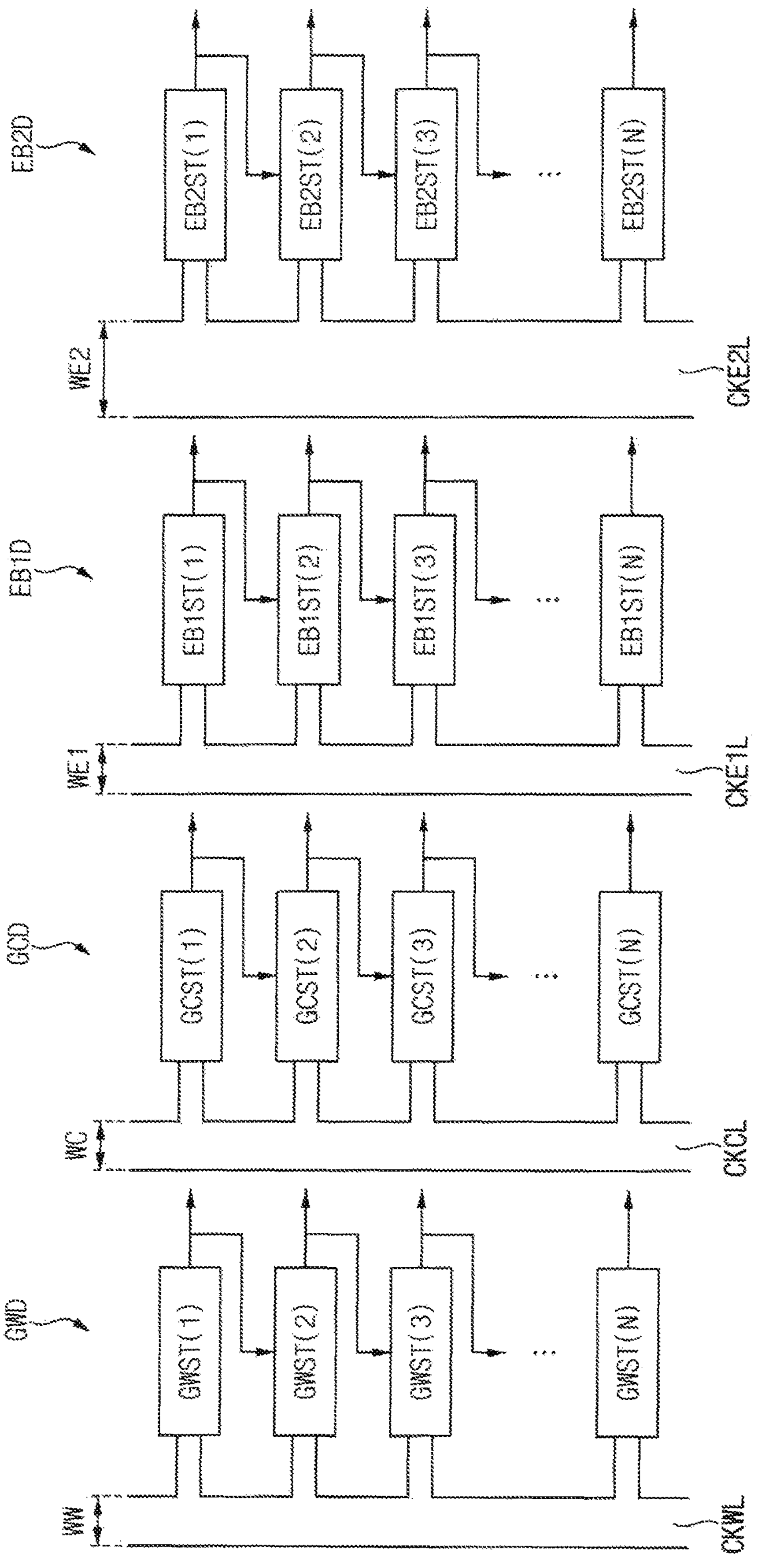
FIG. 10 is a block diagram illustrating a gate driver of FIG. 1.
Figure 11:
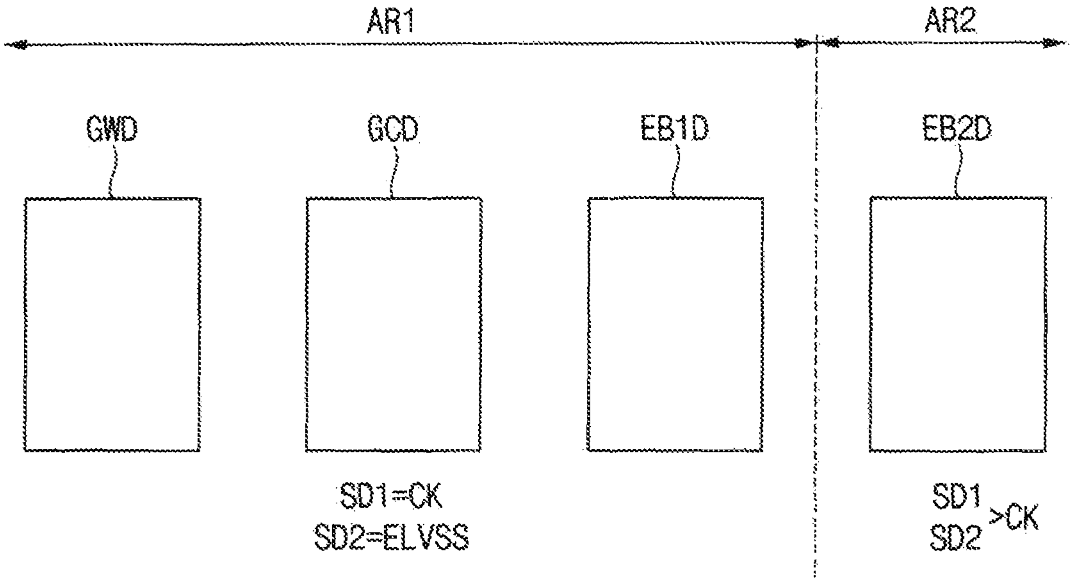
FIG. 11 is a conceptual diagram illustrating an area where the gate driver of FIG. 10 is disposed.
Figure 12:
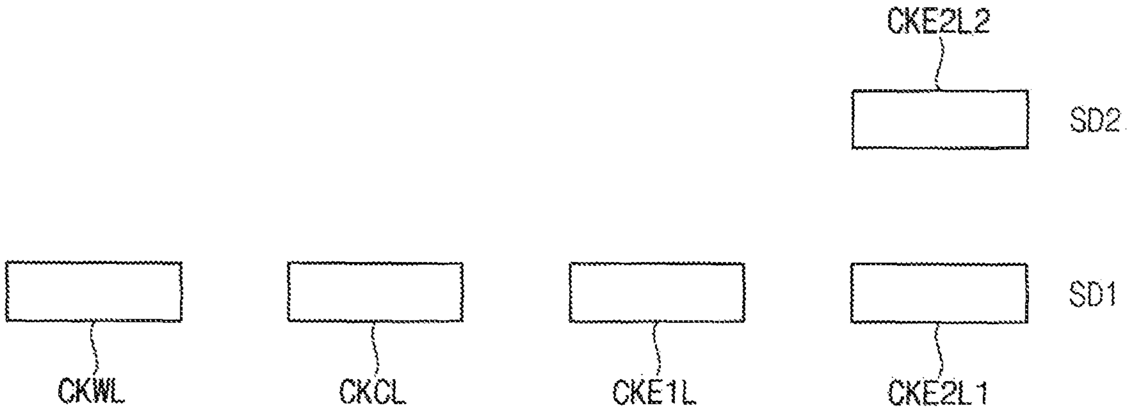
FIG. 12 is a conceptual diagram illustrating a layer structure of clock lines of the gate driver of FIG. 10.

FIG. 10 is a block diagram illustrating the gate driver 300 of FIG. 1. FIG. 11 is a conceptual diagram illustrating an area where the gate driver 300 of FIG. 10 is disposed. FIG. 12 is a conceptual diagram illustrating a layer structure of clock lines of the gate driver 300 of FIG. 10.

Referring to FIG. 10, the gate driver 300 may include a normal gate driver generating a gate signal not applied to the bias switching element and a bias gate driver generating a gate signal applied to the bias switching element.

For example, the normal gate driver may include a data write gate driver GWD, a compensation gate driver GCD and a first initialization gate driver EB1D. The bias gate driver may include a second initialization gate driver EB2D.

As shown in FIG. 10, a width WE2 of a bias clock line CKE2L applying a clock signal to the bias gate driver may be greater than a width WW, WC and WE1 of a normal clock line CKWL, CKCL, CKE1L applying a clock signal to the normal gate driver.

According to FIG. 10, the load of the clock signal of the bias gate driver related to the bias operation may be reduced so that the horizontal line defect may be prevented.

In FIG. 11, the normal gate driver may be disposed in a first area AR1 and the bias gate driver may be disposed in a second area AR2. The first area AR1 may be an area where the low power voltage ELVSS is applied to the second source-drain layer SD2. The second area may be an area where the low power voltage ELVSS is not applied to the second source-drain layer SD2 so that the second source-drain layer SD2 of the second area may be available.

Thus, the normal gate driver disposed in the first area AR1 may receive the clock signal through a normal clock line disposed in the first source-drain layer SD1. The bias gate driver disposed in the second area AR2 may receive the clock signal through a bias clock line formed as a dual layer CKE2L1 and CKE2L2 in the first source-drain layer SD1 and the second source-drain layer SD2.

According to FIGS. 11 and 12, the load of the clock signal of the bias gate driver related to the bias operation may be reduced using the bias clock line formed as the dual layer so that the horizontal line defect may be prevented.

Figure 13:
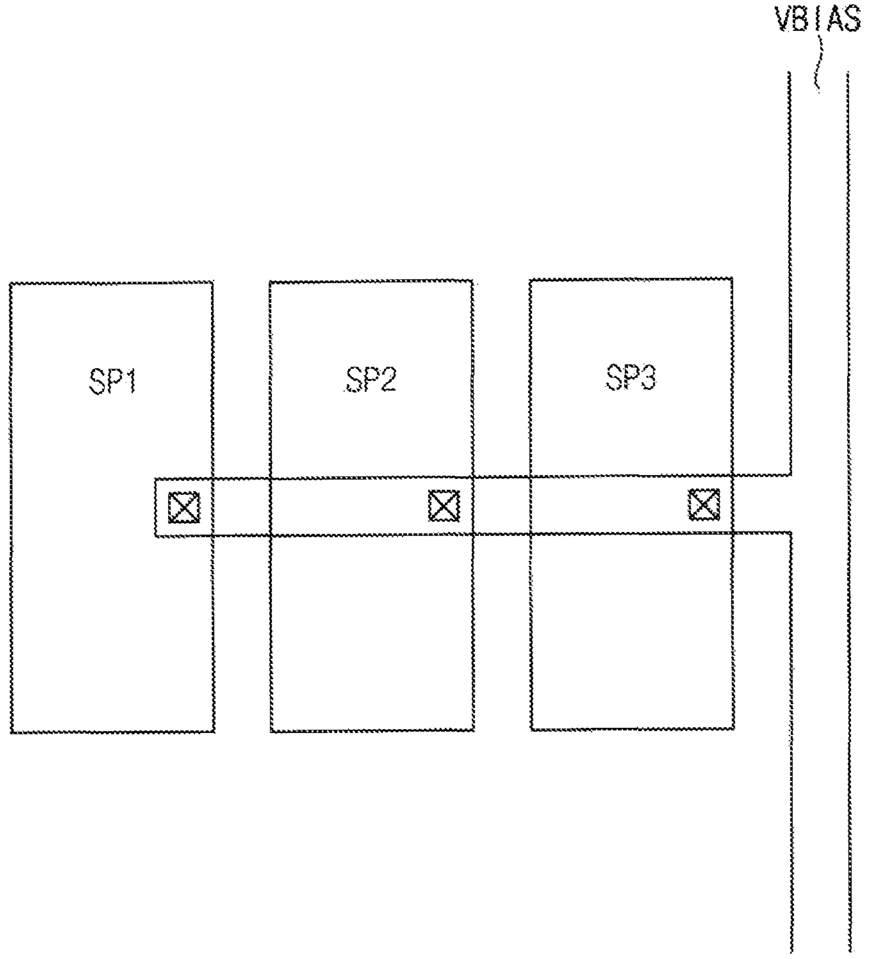
FIG. 13 is a conceptual diagram illustrating the pixels of the display panel of FIG. 1 and a bias voltage line.

FIG. 13 is a conceptual diagram illustrating the pixels of the display panel 100 of FIG. 1 and a bias voltage line.

Referring to FIG. 13, the bias line VBIAS applying the bias voltage may extend in the second direction D2 and may be commonly connected to a plurality of pixels SP1, SP2 and SP3 disposed in the first direction D1. When a space for the bias line VBIAS is insufficient in an active area of the display panel 100, the plurality of pixels SP1, SP2 and SP3 may share the bias line VBIAS so that a space efficiency may be increased.

Figure 14:
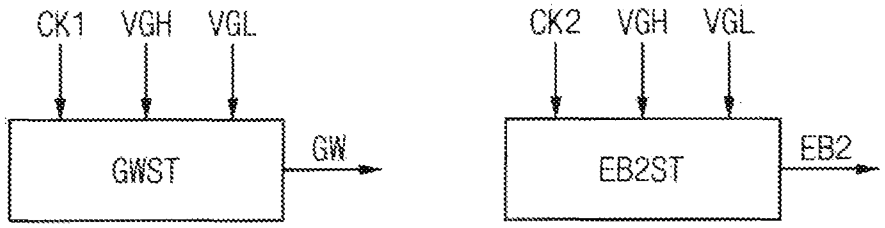
FIG. 14 is a conceptual diagram illustrating an example of a stage of a normal gate driver in the gate driver of FIG. 1 and an example of a stage of a bias gate driver in the gate driver of FIG. 1.
Figure 15:
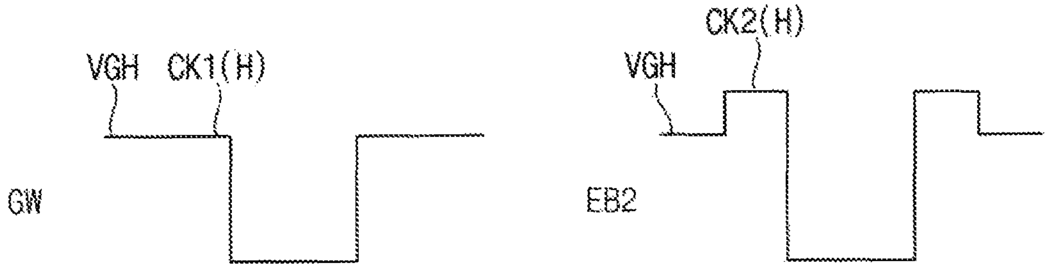
FIG. 15 is a waveform diagram illustrating an output signal of the stage of the normal gate driver of FIG. 14 and an output signal of the stage of the bias gate driver of FIG. 14.

FIG. 14 is a conceptual diagram illustrating an example of a stage of a normal gate driver in the gate driver 300 of FIG. 1 and an example of a stage of a bias gate driver in the gate driver 300 of FIG. 1. FIG. 15 is a waveform diagram illustrating an output signal of the stage of the normal gate driver of FIG. 14 and an output signal of the stage of the bias gate driver of FIG. 14.

Referring to FIGS. 14 and 15, a stage GWST of the normal gate driver may receive a first clock signal CK1, a gate high voltage VGH and a gate low voltage VGL. A stage EB2ST of the bias gate driver related to the bias operation may receive a second clock signal CK2 different from the first clock signal CK1, the gate high voltage VGH and the gate low voltage VGL.

As shown in FIG. 15, a high level CK1(H) of the first clock signal may be substantially the same as the gate high voltage VGH and a high level CK2(H) of the second clock signal may be greater than the gate high voltage VGH.

According to FIGS. 14 and 15, the high level CK2(H) of the second clock signal may be increased so that the load of the clock signal of the bias gate driver related to the bias operation may be reduced. Thus, the horizontal line defect may be prevented.

Figure 16:
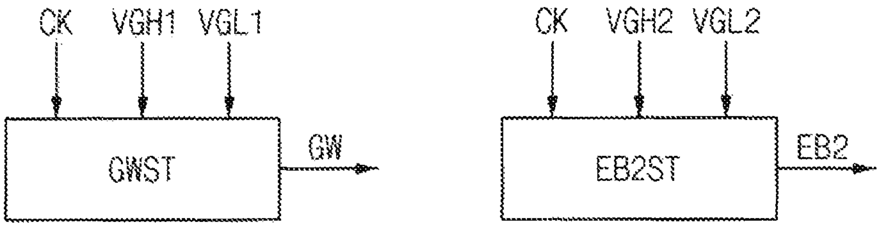
FIG. 16 is a conceptual diagram illustrating an example of a stage of a normal gate driver in the gate driver of FIG. 1 and an example of a stage of a bias gate driver in the gate driver of FIG. 1.

FIG. 16 is a conceptual diagram illustrating an example of a stage of a normal gate driver in the gate driver of FIG. 1 and an example of a stage of a bias gate driver in the gate driver of FIG. 1.

Referring to FIG. 16, a stage GWST of the normal gate driver may receive a clock signal CK, a first gate high voltage VGH1 and a first gate low voltage VGL1. A stage EB2ST of the bias gate driver may receive the clock signal CK, a second gate high voltage VGH2 different from the first gate high voltage VGH1 and a second gate low voltage VGL2 different from the first gate low voltage VGL1.

According to FIG. 16, the level of the second gate high voltage VGH2 and the level of the second gate low voltage VGL2 may be adjusted so that the load of the clock signal of the bias gate driver related to the bias operation may be reduced. Thus, the horizontal line defect may be prevented.

Figure 17:
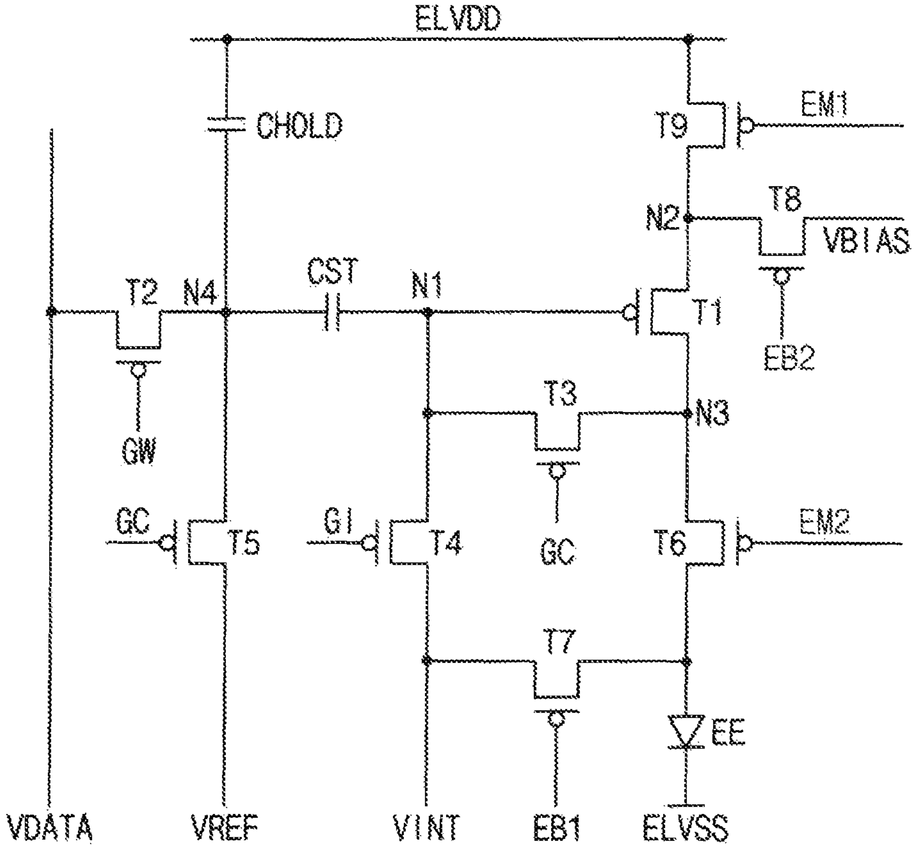
FIG. 17 is a circuit diagram illustrating an example of a pixel of the display panel of FIG. 1.
Figure 18:
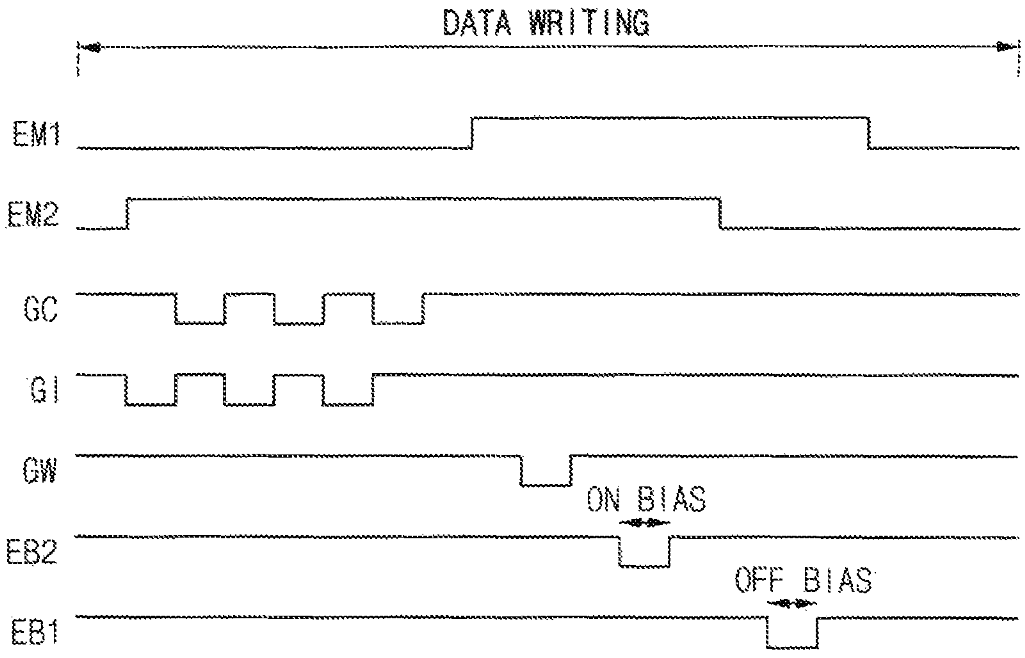
FIG. 18 is a timing diagram illustrating an example of input signals applied to the pixel of FIG. 17 in a data writing period.
Figure 19:
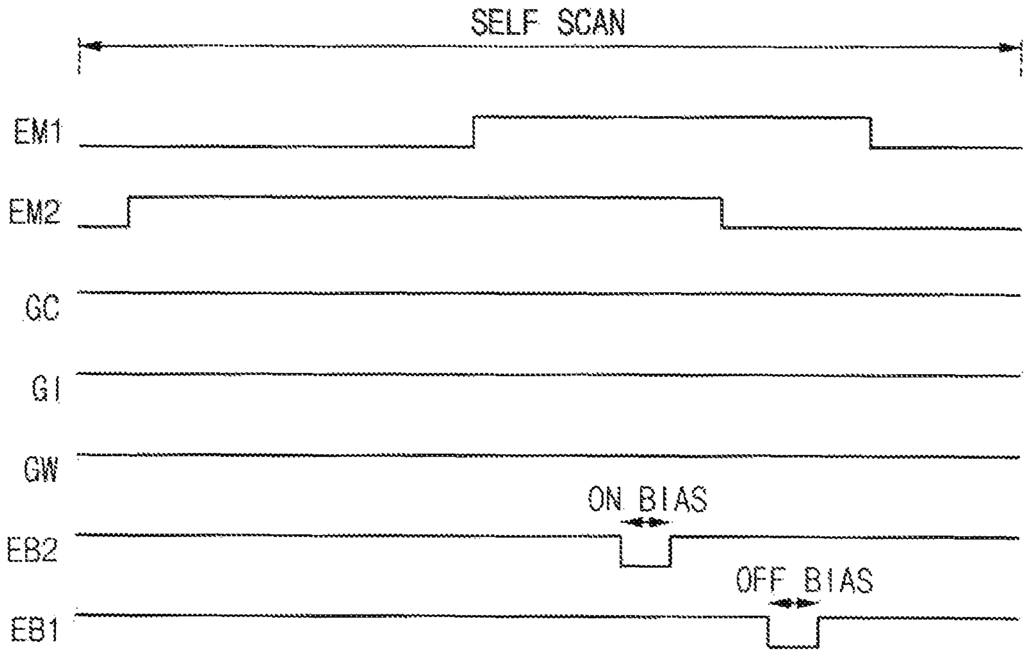
FIG. 19 is a timing diagram illustrating an example of input signals applied to the pixel of FIG. 17 in a self scan period.
Figure 20:
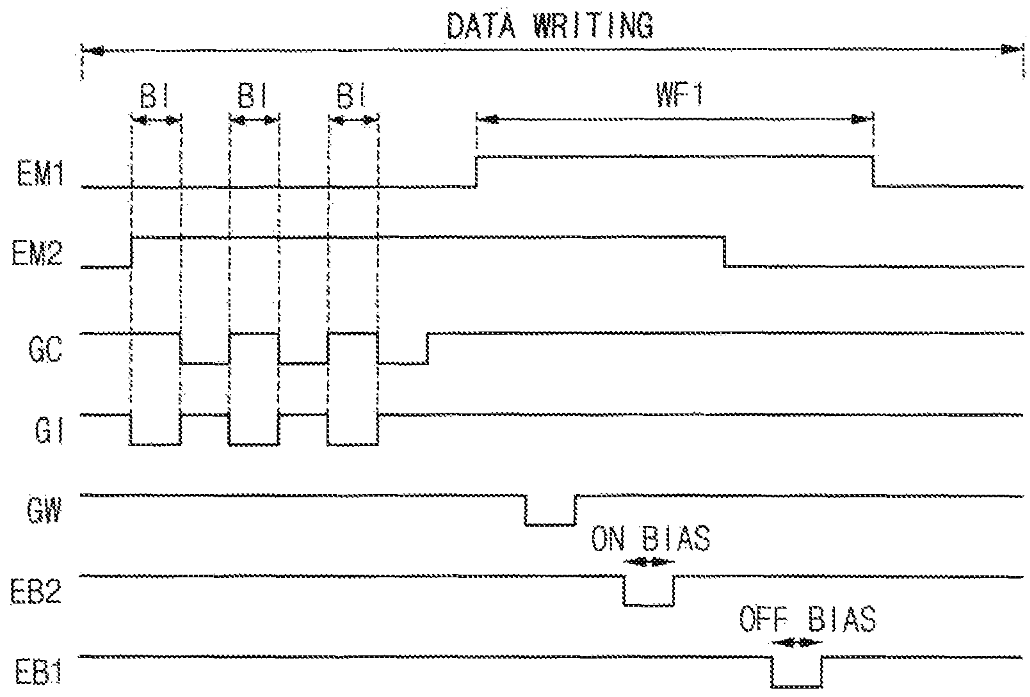
FIG. 20 is a timing diagram illustrating an example of input signals applied to the pixel of FIG. 17 in the data writing period.
Figure 21:
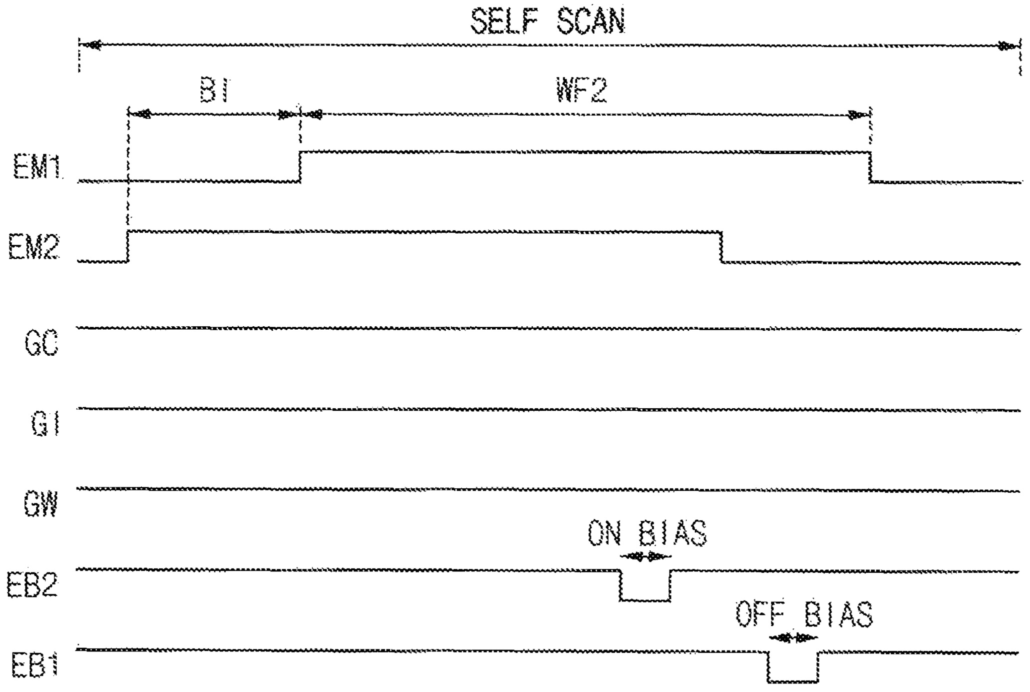
FIG. 21 is a timing diagram illustrating an example of input signals applied to the pixel of FIG. 17 in the self scan period.
Figure 22:
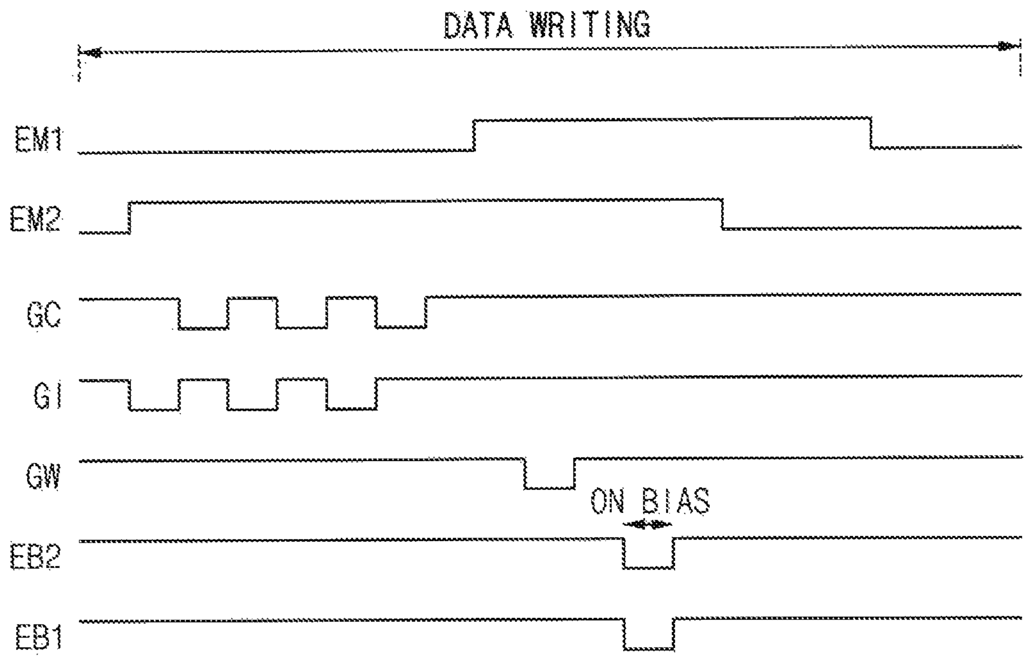
FIG. 22 is a timing diagram illustrating an example of input signals applied to the pixel of FIG. 17 in the data writing period.
Figure 23:
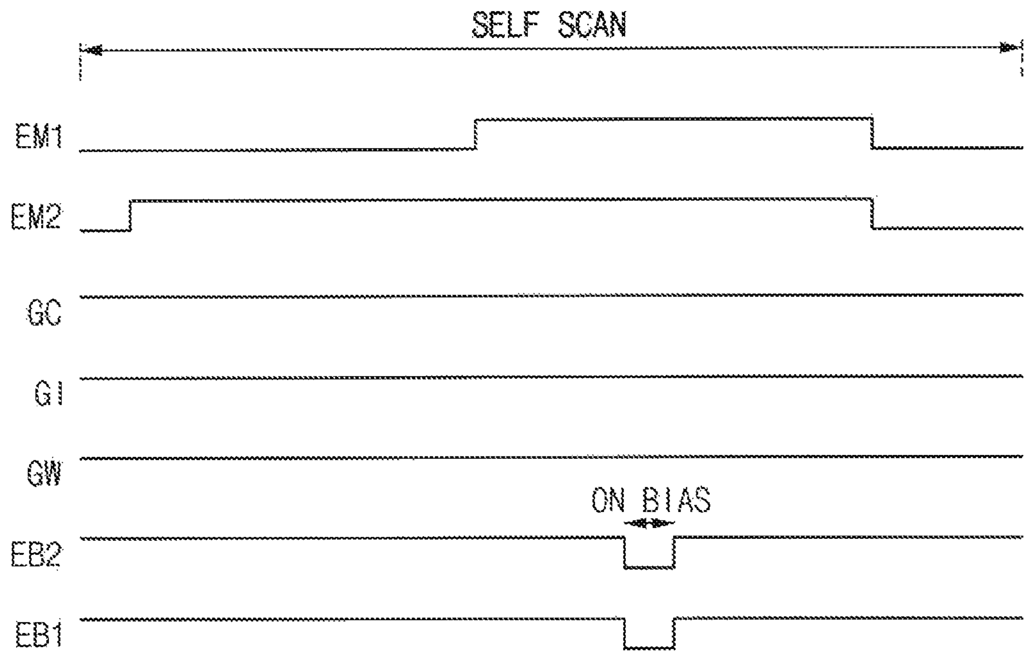
FIG. 23 is a timing diagram illustrating an example of input signals applied to the pixel of FIG. 17 in the self scan period.

FIG. 17 is a circuit diagram illustrating an example of a pixel of the display panel of FIG. 1. FIG. 18 is a timing diagram illustrating an example of input signals applied to the pixel of FIG. 17 in a data writing period. FIG. 19 is a timing diagram illustrating an example of input signals applied to the pixel of FIG. 17 in a self scan period. FIG. 20 is a timing diagram illustrating an example of input signals applied to the pixel of FIG. 17 in the data writing period. FIG. 21 is a timing diagram illustrating an example of input signals applied to the pixel of FIG. 17 in the self scan period. FIG. 22 is a timing diagram illustrating an example of input signals applied to the pixel of FIG. 17 in the data writing period. FIG. 23 is a timing diagram illustrating an example of input signals applied to the pixel of FIG. 17 in the self scan period.

Referring to FIGS. 1, 2, 4 and 17 to 23, the pixel may include a first transistor T1 including a control electrode connected to a first node N1, an input electrode connected to a second node N2 and an output electrode connected to a third node N3, a second transistor T2 including a control electrode receiving a data write gate signal GW, an input electrode receiving a data voltage VDATA and an output electrode connected to a fourth node N4, a third transistor T3 including a control electrode receiving a compensation gate signal GC, an input electrode connected to the first node N1 and an output electrode connected to the third node N3, a fourth transistor T4 including a control electrode receiving a data initialization gate signal GI, an input electrode receiving an initialization voltage VINT and an output electrode connected to the first node N1, a fifth transistor T5 including a control electrode receiving the compensation gate signal GC, an input electrode receiving a reference voltage VREF and an output electrode connected to the fourth node N4, a sixth transistor T6 including a control electrode receiving a second emission signal EM2, an input electrode connected to the third node N3 and an output electrode connected to an anode electrode of a light emitting element EE, a seventh transistor T7 including a control electrode receiving a first initialization gate signal EB1, an input electrode receiving the initialization voltage VINT and an output electrode connected to the anode electrode of the light emitting element EE, an eighth transistor T8 including a control electrode receiving a second initialization gate signal EB2, an input electrode receiving a bias voltage VBIAS and an output electrode connected to the second node N2, a ninth transistor T9 including a control electrode receiving a first emission signal EM1, an input electrode receiving a high power voltage ELVDD and an output electrode connected to the second node N2, a hold capacitor CHOLD including a first electrode receiving the high power voltage ELVDD and a second electrode connected to the fourth node N4 and a storage capacitor CST including a first electrode connected to the fourth node N4 and a second electrode connected to the first node N1. The light emitting element EE may include the anode electrode and a cathode electrode receiving a low power voltage ELVSS.

The driving switching element may be the first transistor T1. The bias switching element may be the eighth transistor T8.

FIG. 18 represents gate signals applied to the pixel in the data writing period DATA WRITING and FIG. 19 represents gate signals applied to the pixel in the self scan period SELF SCAN.

In the present embodiment, an on bias operation ON BIAS for adjusting a voltage of the input electrode of the first transistor T1 may be operated using the eighth transistor T8 and an off bias operation OFF BIAS for adjusting a voltage of the output electrode of the first transistor T1 may be operated using the seventh transistor T7. In the off bias operation OFF BIAS, the seventh transistor T7 and the sixth transistor T6 may be turned on.

The on bias operation ON BIAS may be operated in response to the second initialization gate signal EB2 and the off bias operation OFF BIAS may be operated in response to the first initialization gate signal EB1. In the present embodiment, the gate signal EB2 for the on bias operation ON BIAS and the gate signal EB1 for the off bias operation OFF BIAS are independent so that the on bias operation ON BIAS and the off bias operation OFF BIAS may be finely adjusted so that the horizontal line defect may be prevented.

In FIGS. 20 and 21, a length of a high duration of the first emission signal EM1 in the data writing period DATA WRITING when the data voltage is written to the pixel may be less than a length of a high duration of the first emission signal EM1 in the self scan period SELF SCAN when the data voltage is not written to the pixel and the light emitting element EE is turned on.

In a low duration of the first emission signal EM1, the ninth transistor T9 may be turned on to operate a bias operation BI using the high power voltage ELVDD. A degree of the bias operation BI using the high power voltage ELVDD may be properly adjusted using the length WF1 and WF2 of the high durations of the first emission signal EM1. As explained above, the bias operation BI using the high power voltage ELVDD may be properly adjusted so that the horizontal line defect may be effectively prevented.

Unlike the embodiment in FIGS. 18 and 19, FIGS. 22 and 23 illustrate an embodiment in which an on bias timing and an off bias timing are same as each other. Accordingly, in the present embodiment, the on bias operation ON BIAS is operated but the off bias operation may not be operated. In this case, the gate driver of the first initialization gate signal EB1 and the gate driver of the second initialization gate signal EB2 independently operate so that the load of the gate driver may be reduced in the on bias operation ON BIAS. Thus, the horizontal line defect may be prevented.

According to the present embodiment, in the self scan period of the display apparatus supporting the variable frequency, the bias operation of applying the bias voltage to the input electrode of the driving transistor may be operated in the high frequency so that a flicker may be prevented.

When the bias operation is operated in the high frequency in the self scan period, a horizontal line defect may occur due to an increase of the load of the gate driving signal. The width of the horizontal signal line of the pixel related to the bias operation may be formed to be wide so that the horizontal line defect may be prevented. In addition, the horizontal signal line of the pixel related to the bias operation may be formed with a metal layer having a low resistance so that the horizontal line defect may be prevented. In addition, the horizontal signal line of the pixel related to the bias operation may be formed as a dual layer of the first source-drain layer and the second source-drain layer so that the horizontal line defect may be prevented. In addition, the width of the gate driving signal line applied to the gate driver and related to the bias operation may be formed to be wide so that the horizontal line defect may be prevented. In addition, the gate driving signal applied to the gate driver and related to the bias operation may be adjusted so that the horizontal line defect may be prevented.

Therefore, the horizontal line defect may be prevented in the display apparatus supporting the variable frequency so that the display quality of the display apparatus may be enhanced.

According to the display apparatus of the present embodiment as explained above, the display quality of the display panel may be enhanced.

The foregoing is illustrative of the present inventive concept and is not to be construed as limiting thereof. Although a few example embodiments of the present inventive concept have been described, those skilled in the art will readily appreciate that many modifications are possible in the example embodiments without materially departing from the novel teachings and advantages of the present inventive concept. Accordingly, all such modifications are intended to be included within the scope of the present inventive concept as defined by the claims. In the claims, any means-plus-function clauses are intended to cover the structures described herein as performing the recited function.

What is claimed is:

1. A display apparatus comprising:

a display panel comprising a pixel;

a gate driver configured to provide a gate signal to the pixel;

a data driver configured to provide a data voltage to the pixel; and an emission driver configured to provide an emission signal to the pixel, wherein the pixel comprises:

a light emitting element;

a driving switching element configured to apply a driving current to the light emitting element;

a bias switching element configured to provide a bias voltage to an input electrode of the driving switching element; and a second transistor including a control electrode configured to receive a data write gate signal, an input electrode configured to receive the data voltage and an output electrode connected to a fourth node, wherein a frequency of a bias gate signal applied to a control electrode of the bias switching element is greater than a frequency of the data write gate signal applied to the pixel, wherein the pixel further comprises:

a storage capacitor including a first electrode connected to the fourth node and a second electrode connected to a control electrode of the driving switching element.

2. The display apparatus of claim 1, wherein the emission driver is configured to output a first emission signal and a second emission signal to the pixel, and wherein the bias voltage is a high level of the first emission signal.

3. The display apparatus of claim 1, wherein the display panel is driven in a variable frequency, wherein a first frame having a first frequency includes a first active period and a first blank period, wherein a second frame having a second frequency different from the first frequency includes a second active period and a second blank period, wherein a length of the first active period is substantially the same as a length of the second active period, and wherein a length of the first blank period is different from a length of the second blank period.

4. The display apparatus of claim 1, wherein the gate driver comprises:

a normal gate driver configured to generate a gate signal not applied to the bias switching element; and a bias gate driver configured to generate a gate signal applied to the bias switching element.

5. The display apparatus of claim 4, wherein a width of a bias clock line configured to apply a clock signal to the bias gate driver is greater than a width of a normal clock line configured to apply a clock signal to the normal gate driver.

6. The display apparatus of claim 4, wherein a stage of the normal gate driver is configured to receive a first clock signal, a gate high voltage and a gate low voltage, and wherein a stage of the bias gate driver is configured to receive a second clock signal different from the first clock signal, the gate high voltage and the gate low voltage.

7. The display apparatus of claim 6, wherein a high level of the first clock signal is substantially the same as the gate high voltage, and wherein a high level of the second clock signal is greater than the gate high voltage.

8. The display apparatus of claim 4, wherein a stage of the normal gate driver is configured to receive a clock signal, a first gate high voltage and a first gate low voltage and wherein a stage of the bias gate driver is configured to receive the clock signal, a second gate high voltage different from the first gate high voltage and a second gate low voltage different from the first gate low voltage.

9. The display apparatus of claim 1, wherein a bias line configured to apply the bias voltage extends in a second direction and commonly connected to a plurality of pixels disposed in a first direction.

10. A display apparatus comprising:

a display panel comprising a pixel;

a gate driver configured to provide a gate signal to the pixel;

a data driver configured to provide a data voltage to the pixel; and an emission driver configured to provide an emission signal to the pixel, wherein the pixel comprises:

a light emitting element;

a driving switching element configured to apply a driving current to the light emitting element;

a bias switching element configured to provide a bias voltage to an input electrode of the driving switching element; and a second transistor including a control electrode configured to receive a data write gate signal, an input electrode configured to receive the data voltage and an output electrode connected to a fourth node, wherein a frequency of a bias gate signal applied to a control electrode of the bias switching element is greater than a frequency of the data write gate signal applied to the pixel, wherein the pixel further comprises:

a first transistor including a control electrode connected to a first node, an input electrode connected to a second node and an output electrode connected to a third node; and an eighth transistor including a control electrode configured to receive a second initialization gate signal, an input electrode configured to receive the bias voltage and an output electrode connected to the second node, wherein the driving switching element is the first transistor and the bias switching element is the eighth transistor.

11. The display apparatus of claim 10, wherein the pixel further comprises:

a third transistor including a control electrode configured to receive a compensation gate signal, an input electrode connected to the first node and an output electrode connected to the third node.

12. The display apparatus of claim 10, wherein the pixel further comprises:

a fourth transistor including a control electrode configured to receive a data initialization gate signal, an input electrode configured to receive an initialization voltage and an output electrode connected to the first node.

13. The display apparatus of claim 10, wherein the pixel further comprises:

a fifth transistor including a control electrode configured to receive a compensation gate signal, an input electrode configured to receive a reference voltage and an output electrode connected to the fourth node.

14. The display apparatus of claim 10, wherein the pixel further comprises:

a sixth transistor including a control electrode configured to receive a second emission signal, an input electrode connected to the third node and an output electrode connected to an anode electrode of the light emitting element.

15. The display apparatus of claim 10, wherein the pixel further comprises:

a seventh transistor including a control electrode configured to receive a first initialization gate signal, an input electrode configured to receive an initialization voltage and an output electrode connected to an anode electrode of the light emitting element.

16. The display apparatus of claim 10, wherein the pixel further comprises:

a ninth transistor including a control electrode configured to receive a first emission signal, an input electrode configured to receive a high power voltage and an output electrode connected to the second node.

17. The display apparatus of claim 10, wherein the pixel further comprises:

a hold capacitor including a first electrode configured to receive a high power voltage and a second electrode connected to the fourth node.

18. A display apparatus comprising:

a display panel comprising a pixel;

a gate driver configured to provide a gate signal to the pixel;

a data driver configured to provide a data voltage to the pixel; and an emission driver configured to provide an emission signal to the pixel, wherein the pixel comprises:

a light emitting element;

a driving switching element configured to apply a driving current to the light emitting element;

a bias switching element configured to provide a bias voltage to an input electrode of the driving switching element; and a second transistor including a control electrode configured to receive a data write gate signal, an input electrode configured to receive the data voltage and an output electrode connected to a fourth node, wherein a frequency of a bias gate signal applied to a control electrode of the bias switching element is greater than a frequency of the data write gate signal applied to the pixel, wherein the gate driver comprises:

a normal gate driver configured to generate a gate signal not applied to the bias switching element; and a bias gate driver configured to generate a gate signal applied to the bias switching element, wherein the normal gate driver disposed in a first area is configured to receive a clock signal through a normal clock line disposed in a first source-drain layer, and wherein the bias gate driver disposed in a second area is configured to receive a clock signal through a bias clock line formed as a dual layer in the first source-drain layer and a second source-drain layer.

* * * * *